United States Patent [19]
Lechleider

[11] Patent Number: 6,058,109
[45] Date of Patent: May 2, 2000

[54] COMBINED UNIFORM RATE AND BURST RATE TRANSMISSION SYSTEM

[75] Inventor: Joseph William Lechleider, Morristown, N.J.

[73] Assignee: The Kohl Group, Inc., Parsippany, N.J.

[21] Appl. No.: 08/794,969

[22] Filed: Feb. 4, 1997

[51] Int. Cl.[7] .................................................. H04L 12/66
[52] U.S. Cl. .......................... 370/352; 370/413; 370/468
[58] Field of Search .................................... 370/352, 354, 370/356, 468, 412, 413, 414, 417

[56] References Cited

U.S. PATENT DOCUMENTS

| | | | |
|---|---|---|---|
| 4,763,321 | 8/1988 | Calvignac et al. ....................... | 370/352 |
| 5,570,355 | 10/1996 | Dail et al. ............................... | 370/352 |
| 5,640,392 | 6/1997 | Hayashi .................................. | 370/395 |

OTHER PUBLICATIONS

Dravida et al; "Analysis and Engineering of a Voice/Data Packet Multiplexer"; IEEE Transactions on Communications, vol. 41, No. 1; pp. 1656–1657, Nov. 1, 1993.

Lee S. H.; "An Intergrated Transport Technique for Circuit and Packet Switched Traffic"; IEEE No. Conf. 7, pp. 110–118, Mar. 27, 1988.

*Primary Examiner*—Chi H. Pham
*Assistant Examiner*—Maikhanh Tran
*Attorney, Agent, or Firm*—John T. Peoples

[57] ABSTRACT

A transceiving methodology and concomitant transceiving system wherein high speed, bursty channels are combined with uniform data rate services into a single, interleaved data stream. A system for communicating both a uniform data stream and a bursty data stream over a communication medium includes: (i) a transmitter for combining the uniform data stream and the bursty data stream into a single, interleaved stream, and for propagating the interleaved stream over the medium; and (ii) a receiver for processing the single interleaved stream to separate the uniform data stream and the bursty data stream.

13 Claims, 19 Drawing Sheets

COMBINED UNIFORM RATE AND BURST RATE TRANSMISSION SYSTEM

BACKGROUND OF THE DISCLOSURE

1. Field of the Invention

This invention relates generally to communication systems, and, more particularly, to circuitry and a concomitant methodology for transceiving a uniform data stream and a bursty data stream in a single interleaved stream.

2. Description of the Background

Currently communications service providers are focusing their attention on modems that operate in the multi-megabit range. For instance, CATV companies are planning to provide such high-speed modem service by grouping several customers so that they share a common channel that might otherwise be used only for an entertainment video service. This bus arrangement takes advantage of the bursty nature of modem traffic. Modem users are anticipated to need data at high rates for only very short periods of time, with relatively long quiescent periods between data bursts, so that the average data rate for any one user is much lower than the maximum rate that the user might occasionally require. Moreover, if the data is packetized, users could invoke the service for as little as the duration of one packet in a given instance of system use, which might be less than a kilobit of data. However, it is important in many applications that the delay in transmission and transmission processing of the data be minimal because the data being transmitted might be involved in an interactive process. These characteristics of bursty-type data transmission permit so-called statistical multiplexing of a data bus.

On the other hand, there are many communication services which have characteristics that are essentially opposite from those of aforementioned bursty data transmission characteristics. For example, entertainment video services are quite insensitive to even relatively long transmission delays, but it is important that a bit stream representing a digital version of a video signal not be interrupted once the user has started viewing an intelligible sequence. The same is also true of other services, such as the transmission of a long file to a waiting database. In this type of communications system, the data rate is essentially constant and the average data rate and maximum data rate on the medium are very close if not equal. For such systems, a bus arrangement is inappropriate unless many users are using the same data (broadcast mode), as in a CATV network. Hence, such systems are typically configured in a star or bus/star network.

Representative of prior art for controlling data flow over a transmission medium is U.S. Pat. No. 4,995,056 issued to Fogg et al. (Fogg). In Fogg, a sending system and a receiving system have multiple data buffers. The receiving system informs the sending system, in response to a sending system request, of the number of empty data buffers in the receiving system. The sending system can then propagate no more than the number of bits that will fill the empty receiver buffers. After the receiving system empties a number of buffers, the receiving system sends this information to the sending system. The receiving system and the sending system alternately communicate the number of empty receive data buffers and data bits to fill the buffers.

The art is devoid of teachings or suggestions wherein, given the contrasting requirements of a uniform data stream arising from such services as entertainment-type video services and the bursty data stream emanating from modem-type traffic, the uniform data stream and bursty data stream are synergistically combined in a transmitter into a single, interleaved data stream for communication over a given transmission medium, and separated in a receiver into the uniform stream and the bursty stream for use by the customer.

SUMMARY OF THE INVENTION

These and other shortcomings and limitations of the prior art are obviated, in accordance with the present invention, by a transceiving methodology and concomitant transceiving circuitry wherein high speed, bursty channels are combined with uniform data rate services in a single, interleaved data stream.

Broadly, in accordance with the present invention, the system for communicating both a uniform data stream and a bursty data stream over a communication medium includes: (i) a transmitter for combining the uniform data stream and the bursty data stream into a single, interleaved stream, and for propagating the interleaved stream over the medium; and (ii) a receiver for processing the single interleaved stream to separate the uniform data stream and the bursty data stream.

In accordance with an illustrative embodiment of the present invention, the transmitter, which simultaneously processes both the incoming uniform data stream and the incoming bursty data stream for transmission over the communication medium, includes: (a) a uniform transmitter buffer for storing the uniform data stream; (b) a data stuffer for storing null data in the uniform transmitter buffer whenever the contents of the uniform transmitter buffer are less than a predetermined threshold; (c) a bursty transmitter buffer for storing the bursty data stream; (d) a switch coupled to the uniform transmitter buffer and the bursty transmitter buffer; and (e) a controller, coupled to the uniform transmitter buffer and the bursty transmitter buffer, for switching the switch between the uniform transmitter buffer and the bursty transmitter buffer as determined by the contents of the uniform transmitter buffer and the bursty transmitter buffer to generate the single interleaved data stream for delivery to the medium, the single data stream being composed of interleaved portions of the uniform data stream, including null data, if any, and the bursty data stream.

In accordance with an illustrative embodiment of the present invention, the receiver includes: (a) a data separator for separating the single, interleaved data stream into a uniform received data stream and a bursty received data stream; (b) a uniform receiver buffer for storing the uniform received data stream; (c) a bursty receiver buffer for storing the bursty received data stream; and (d) a uniform receiver, coupled to the uniform receiver buffer, for delivering the uniform data stream to a customer at a predetermined rate.

The data rate of the combined system is essentially the sum of the data rate of the uniform rate service and the average data rate (including quiescent periods) for the bursty data stream. Thus, for example, a single Asymmetrical Digital Subscriber Line (ADSL) operating at a rate slightly in excess of the rate required for entertainment video would simultaneously provide switched digital video service and high speed modem service, without interruption of the video signal, but with an added, constant delay of the video signal.

The system in accordance with the present invention also allows for other uses of the ADSL channel simultaneously with the video signal, such as the insertion of an alarm or alerting signal without interrupting the video signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in providing for the insertion of bursty, high-speed data into a high-speed, uniform-rate data stream without disruption of the uniform rate of the latter stream. In the sequel, the bursty, high-speed data is called the "bursty" stream, and the high-speed, uniform-rate data is called the "uniform" stream. The medium that carries the combined uniform rate stream and the bursty stream is called the "channel"; examples of such channels include HDSL, ADSL, ISDN Basic Access, and 56 kilobits/sec DDS. The descriptors "uniform" and "bursty", respectively, will also be applied to all devices and principles of operation that are associated with the two types of data streams.

By way of nomenclature and terminology, it is supposed that a desired service such as an entertainment video requires a uniform data rate of B bits/sec (bps), and a bursty data service requires an average data rate of b bps, including quiescent periods. If the rate of the channel is B+kb bps, where k>1, these two data services are candidates for combining if the effects of interruptions and delays on the uniform stream are inconsequential, that is, have no deleterious effect on the uniform stream.

Figure 1:
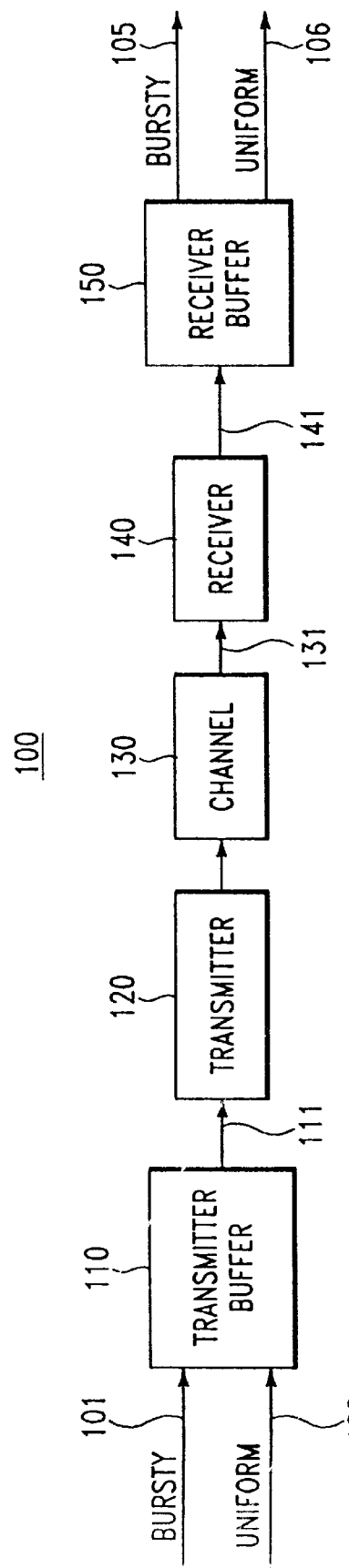
FIG. 1 depicts a high-level block diagram of the transmitting and receiving system in accordance with the present invention.

An illustrative embodiment for effecting the combination of a uniform data stream and a bursty data stream is system 100 as depicted in block diagram form in FIG. 1. A bursty stream and a uniform stream are delivered to the transmit-side of system 100 via separate input signal paths 101 and 102, respectively, serving as inputs to transmitter buffer 110. The separate streams are combined into a single data stream in transmitter buffer 110, which will be described in more detail with reference to FIG. 2 below. Buffer 110 provides the single stream of interleaved bursty and uniform streams to transmitter 120 via signal path 111. Transmitter 120 prepares the single data stream for propagation over channel 130 by, for example, coding, signal shaping, and other appropriate, well-known transmission operations which match the output of transmitter 120 to channel 130 for effective propagation of the data stream over channel 130. Channel 130 delivers its output on signal path 131, which serves as an input to receiver 140; receiver 140 performs the converse operations with respect to transmitter 120, that is, the usual and well-known channel reception operations, including decoding when necessary, and passes the received data stream appearing on signal path 141 to receiver buffer 150, which will be described in more detail with reference to FIG. 3 below. Buffer 150 separates the uniform and bursty streams on signal path 141, and delivers the separated streams, namely the bursty received stream and the uniform received stream, on signal paths 105 and 106, respectively.

Transmitter Buffer 110

Figure 2:
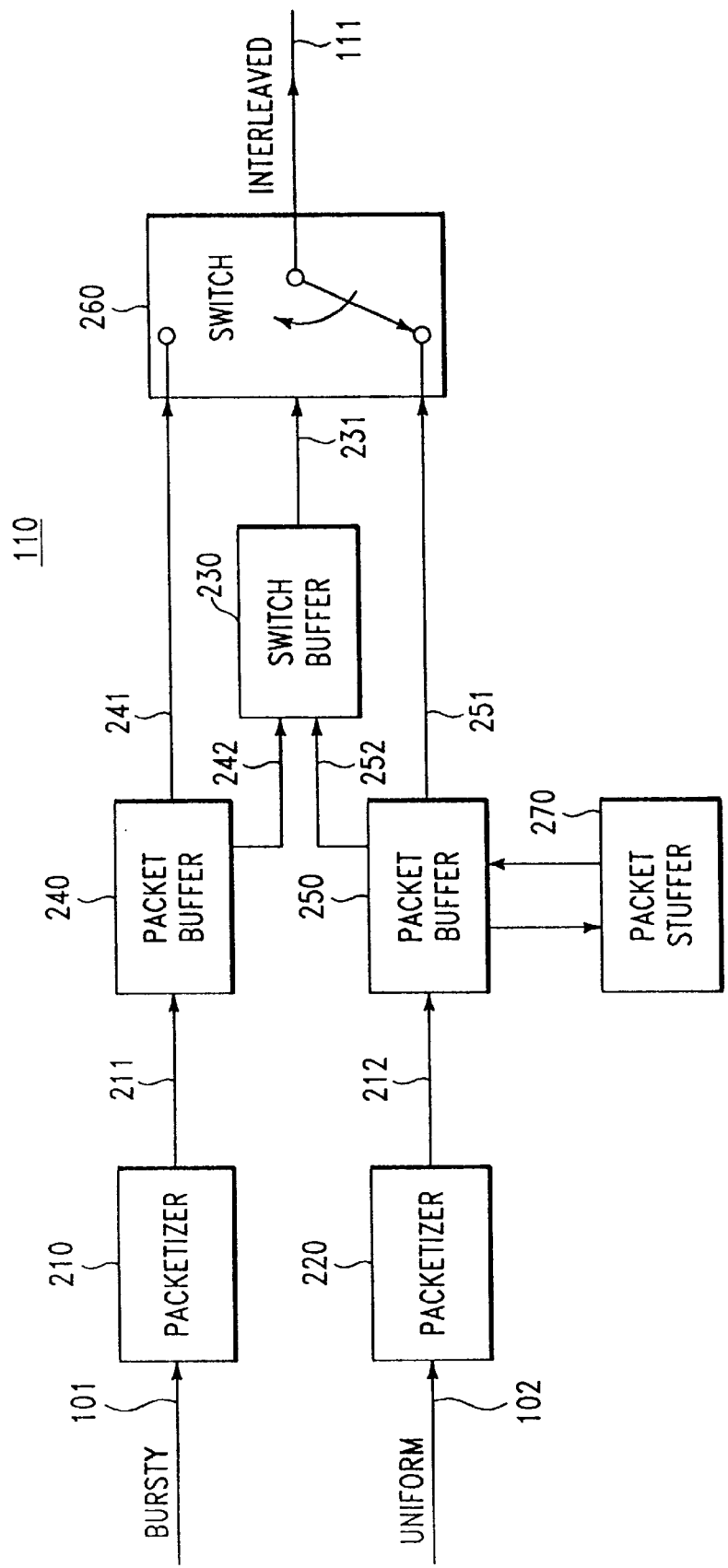
FIG. 2 shows an illustrative embodiment of a transmitter buffer.

An illustrative embodiment of transmitter buffer 110 is depicted in high-level block diagram form in FIG. 2. Referring now to FIG. 2, the bursty and uniform streams enter buffer 110 via signal paths 101 and 102, respectively. In particular, the bursty stream on path 101 serves as an input to packetizer 210, whereas the uniform stream on path 102 serves as an input to packetizer 220; for purposes of generality, the packet sizes for the two streams may differ. Packetizer 210 provides the packets generated from bursty stream 101 to packet buffer 240; similarly, packetizer 220 provides packets derived from uniform stream 102 to packet buffer 250. As described with respect to FIG. 1, transmitter buffer 110, via its packet buffers 240 and 250, provides packet streams that are interleaved into a single packet stream which serves as an input to transmitter 120 via signal lead 111. To generate the single, interleaved packet stream, packet buffers 240 and 250 serve as dual inputs to switch 260 via signal paths 241 and 251, respectively. Switch 260 is controlled, in turn, by switch controller 230. Controller 230 also has inputs from packet buffers 240 and 250, and the output of controller 230 controls switch 260 via lead 231.

Switch 260 alternately selects as its input the packet stream from packet buffer 240 or the packet stream from packet buffer 250 in the manner now described in detail. (It is assumed for purposes of the immediate discussion that system 100 is operating in steady-state mode, that is, an initial start-up period has been completed—system start-up will be described below after the description of receiver buffer 150 of FIG. 1 is completed so that the necessary antecedents to start-up have been fully described.) Switch 260 generally takes its input from bursty packet buffer 240, via signal path 241, when there are bursty packets available for propagation; switch controller 230 is alerted to the presence of packets in bursty packet buffer 240 via signal lead 242 emanating from buffer 240. When bursty packet buffer 240 is empty, switch 260 is switched to take its input from uniform packet buffer 250 via signal path 251. The signal on lead 242 from bursty packet buffer 240 alerts switch controller 230 that bursty packet buffer 240 is empty. Also, switch 260 is switched to uniform signal path 251 whenever uniform packet buffer 250 is almost full to ensure that uniform transmission is not interrupted. Switch 260 continues to takes its input from uniform buffer 250 until uniform packet buffer 250 is essentially empty, whereupon switch 260 is released to take its input from bursty buffer 240 as needed, as indicated by signal lead 242 asserting switch controller 230.

Accordingly, operation of transmit buffer 110 automatically provides for minimal interruption of the transmission of the uniform data stream and maximal intervals during which the bursty data stream is permitted. The maximum duration of bursty transmission and the interval between bursty transmissions is determined by the sizes of packet buffers 240 and 250. The rate of channel 130 is selected to be greater than the uniform data rate, so that uniform buffer 250 will, in the absence of bursty data, eventually empty. To prevent this condition and its deleterious effects, packet stuffer 270 is deployed to insert a "null" packet into uniform buffer 250 whenever there is no packet in uniform buffer 250 and no packet is forthcoming from uniform packetizer 220. A "null" packet is identified as such in its packet header, so that each "null" packet can be discarded by receiver buffer 150 (see FIG. 1).

The size of uniform buffer 250 must be large enough so that all of the delivered uniform packets can be stored during the periods that bursty buffer 240 is delivering packets to transmitter 120 via switch 260, and ultimately to channel 130. Thus, if a bursty packet is $P_b$ bits long, and the maximum permissible burst of transmission on channel 130 is $B_b$ packets, then uniform buffer 250 must be capable of storing incoming uniform data for a period of $(P_b B_b)/R_c$ sec, where $R_c$ is the rate of channel 130. If the rate of arrival of uniform data is $R_u$, uniform buffer 250 must then have a capacity of $(P_b B_b R_u)/R_c$ bits; if the length of a uniform packet is $P_u$ bits, uniform buffer 250 must have a capacity of $(P_b B_b R_u)/(P_u R_c)$ packets.

Receiver Buffer 150

Figure 3:
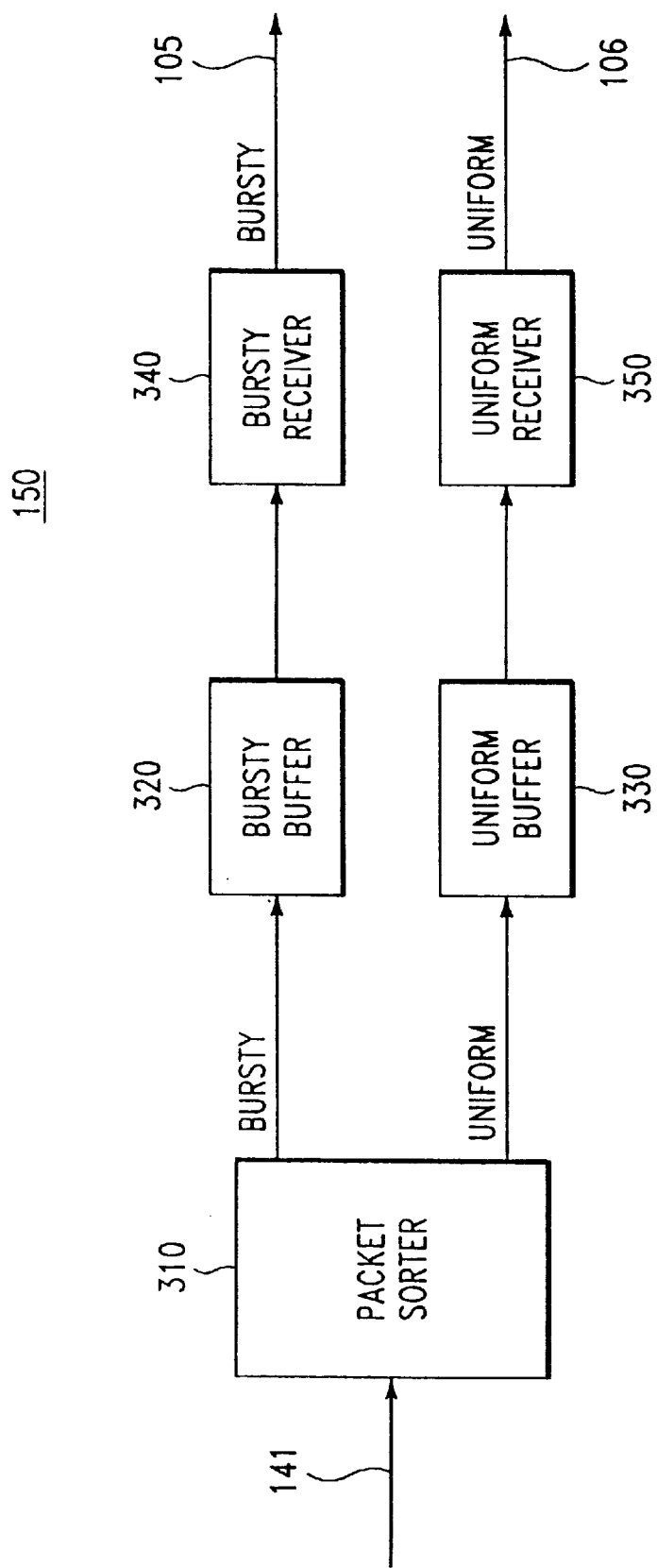
FIG. 3 shows an illustrative embodiment of a receiver buffer.

The structure of receiver buffer 150 is essentially the converse of transmitter buffer 110, except that the uniform buffer portion of the receiver buffer 150 must have sufficient capacity to maintain a constant uniform output data rate while channel 130 is propagating the bursty data part of the interleaved stream. With reference to FIG. 3, receiver buffer 150 receives its input over signal path 141 from receiver 140. In particular, packet sorter 310 identifies each packet by parsing its header as it arrives and discards null packets that were stuffed into transmitter buffer 110. Moreover, packet sorter 310 routes packets to bursty buffer 320 or uniform buffer 330 upon identification. The purpose of bursty buffer 320 is only to accommodate delays that might be imposed by the bursty receiver 340, as explained below; so buffer 320 is sized to accommodate the delays. On the other hand, uniform buffer 330 must be large enough so that uniform receiver 350 is supplied with a steady stream of packets notwithstanding hiatuses imposed by bursty traffic seizures of channel 130. If the maximum permissible lapsed time in the uniform transmission on channel 130 because of a burst is $(P_b B_b)/R_c$, uniform buffer 330 must not empty in this time, so that is capacity must be $(P_b B_b R_u)/R_c$ bits, which is the same as that of uniform transmitter packet buffer 250. However, in practice, uniform receiver packet buffer 330 is chosen to be larger than uniform transmitter packet buffer 250 to accommodate inherent latency of channel 130.

The size of uniform receiver buffer 330 also determines the required length of hiatus between maximum length bursts, because uniform buffer 330 must have sufficient time to fill up again before another hiatus in the uniform stream transmission. If channel 130 delivers uniform stream data at a rate of $R_c$ and uniform receiver 350 collects data at a rate $R_u$, the rate at which uniform buffer 330 fills up is $(R_c - R_u)$ bps, so that uniform buffer 330 will fill up in h sec, where $h = [(P_b B_b R_u)/R_c]/[R_c - R_u]$. This last expression permits the calculation of the transmission channel rate required to accommodate the combined uniform and bursty data streams, as follows:

$$R_c = 0.5 R_u \left[ 1 + \left( 1 + \frac{4 P_b B_b}{h R_u} \right)^{0.5} \right].$$

Thus $R_c$ is determined in terms of: (i) the size of bursty buffer 240 or 320 ($B_b$); (ii) the packet size of the bursty stream ($P_b$); (iii) the maximum duration between bursts (h); and (iv) the rate of the uniform data stream ($R_u$). (Note that the expression for $R_c$ does not explicitly include the rate of the bursty data stream. The reason for this is readily understood since the bursty channel rate, when transmitting, may be far in excess of the average rate.)

System Initialization and Continuing Operation

There are two parts to the operation of system 100 that are pertinent, namely, system start-up and continuing operation, as follows:

(1) transmission channel 130 is initialized with its normal start-up protocol, which may involve a training period for setting parameters for transmitter 120 and receiver 140;

(2) the uniform data stream is started whenever a customer requests a uniform service. After uniform receiver buffer 140 is full, uniform data begins to flow out of uniform receiver buffer 140, thereby commencing uniform service; and (3) system 100 is now effectively in continuing operational mode. When a bursty data stream arrives, it will be immediately transmitted, and transmission of the bursty data stream will continue as long as there is data in bursty buffer 220 and uniform buffer 240 is not empty, as was previously described in detail above.

Illustrative Example

To gain additional insight into the circuitry comprising system 100 as well as the principles of operation of the present invention, an illustrative example is presented in terms of normalized parameters. It is supposed for this example that: (i) channel 130 transmits at a rate of 2 packets per second; (ii) uniform transmitter packet buffer 250 is 10 packets long and receives packets at the rate of 1 packet per second from uniform stream 102; (iii) uniform receiver packet buffer 330 is 11 packets long and outputs packets at the rate of 1 packet per second to a customer (thus the throughput of the uniform portion of system 100 is 1 packet per second); and (iv) the maximum burst time is 6 seconds, that is, the transmission of packets from uniform packet buffer 250 is inhibited for a maximum of 6 seconds. Moreover, it is assumed that uniform packet buffer 250, once turned on, stores a minimum number of three packets; to effect this minimum number, null packets are stuffed as needed. In addition, it is assumed that uniform receiver packet buffer 330 initially waits until 10 packets have been stored before it initiates transmission to the customer.

Referring now to the timing diagram of FIGS. 4–8, there is shown: (i) on the top-most time line, the flow of interleaved packets on channel 130; (ii) on the middle time line, the flow of packets emitted by uniform transmitter packet buffer 250; and (iii) on the bottom-most time line, the flow of packets received by uniform receiver packet buffer 330. Packets stored in uniform packet buffer 250 are enumerated sequentially, that is, these packets are numbered sequentially starting with packet 1, then packet 2, packet 3, and so forth. These packets serves as inputs to packet buffer 250 at a uniform rate of 1 packet per second; a 0 packet is used to designate a null packet. Thus, initially buffer 250 stores three null packets (recall the assumption that buffer 250 will always store at least 3 packets, so the three null packets are a consequence of "turning-on" the system). During the interval from 0 to 1 second (hereinafter, the shorthand (0–1) is used for this interval, and similar notation applies to other intervals), uniform buffer 250 stores packet 1 arriving at its input, and transmits two null packets since the output rate is 2 packets per second. Since only 1 packet was stored during (0–1), and two packets are transmitted, it is necessary to stuff buffer 350 with another null packet to have at least three packets in the queue.

Figure 7:
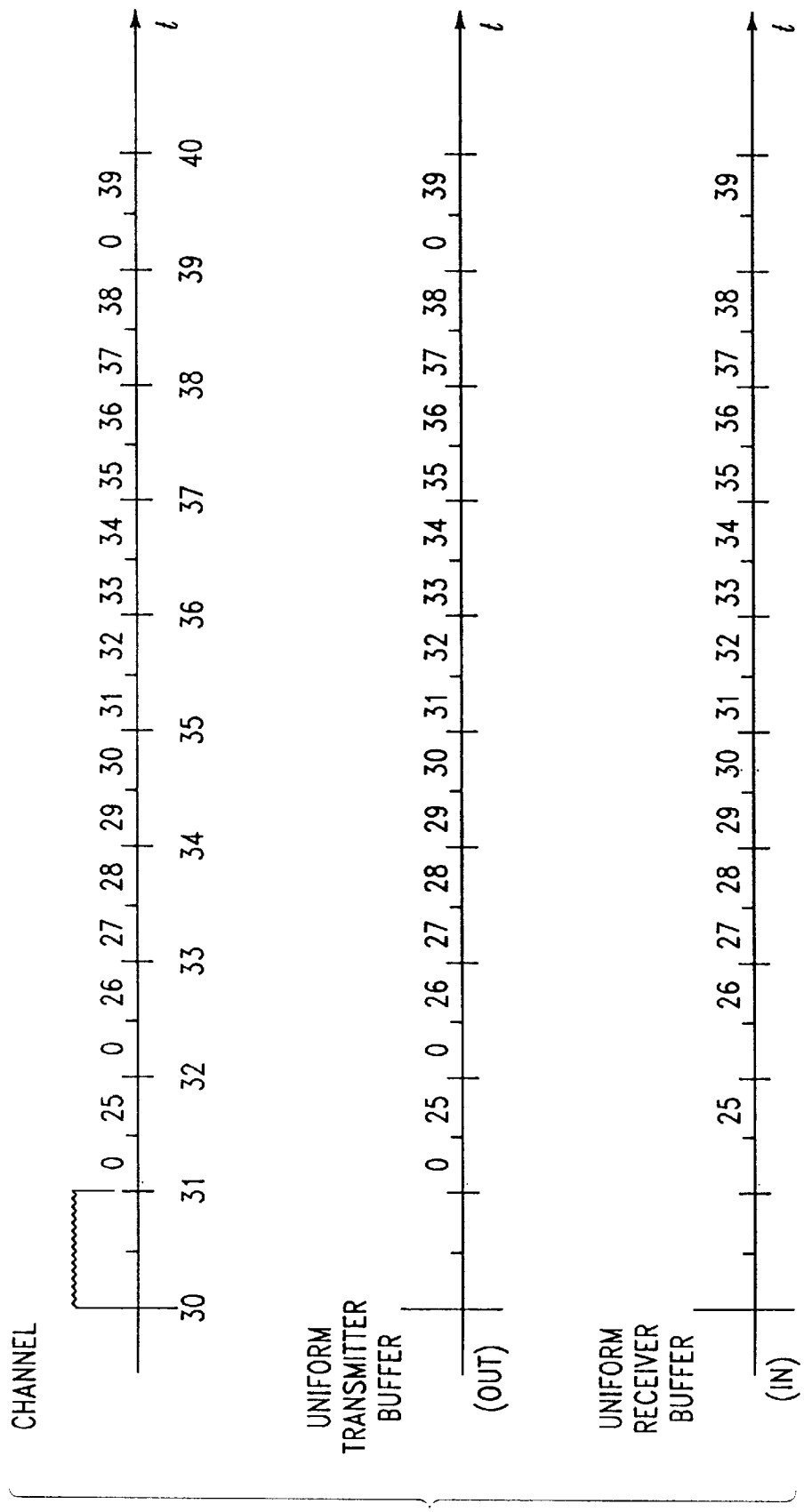
Figure 8:
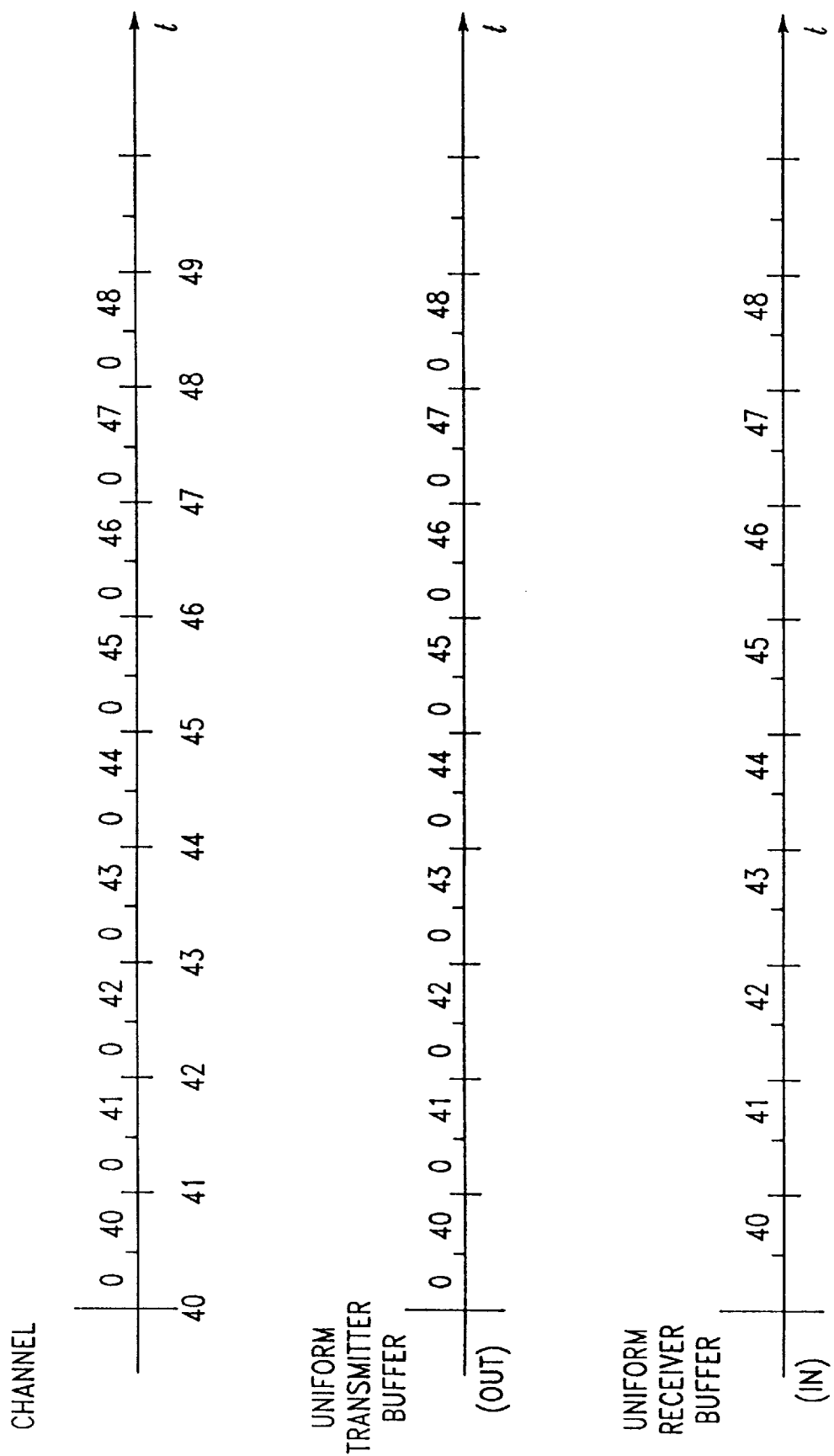
Figure 9:
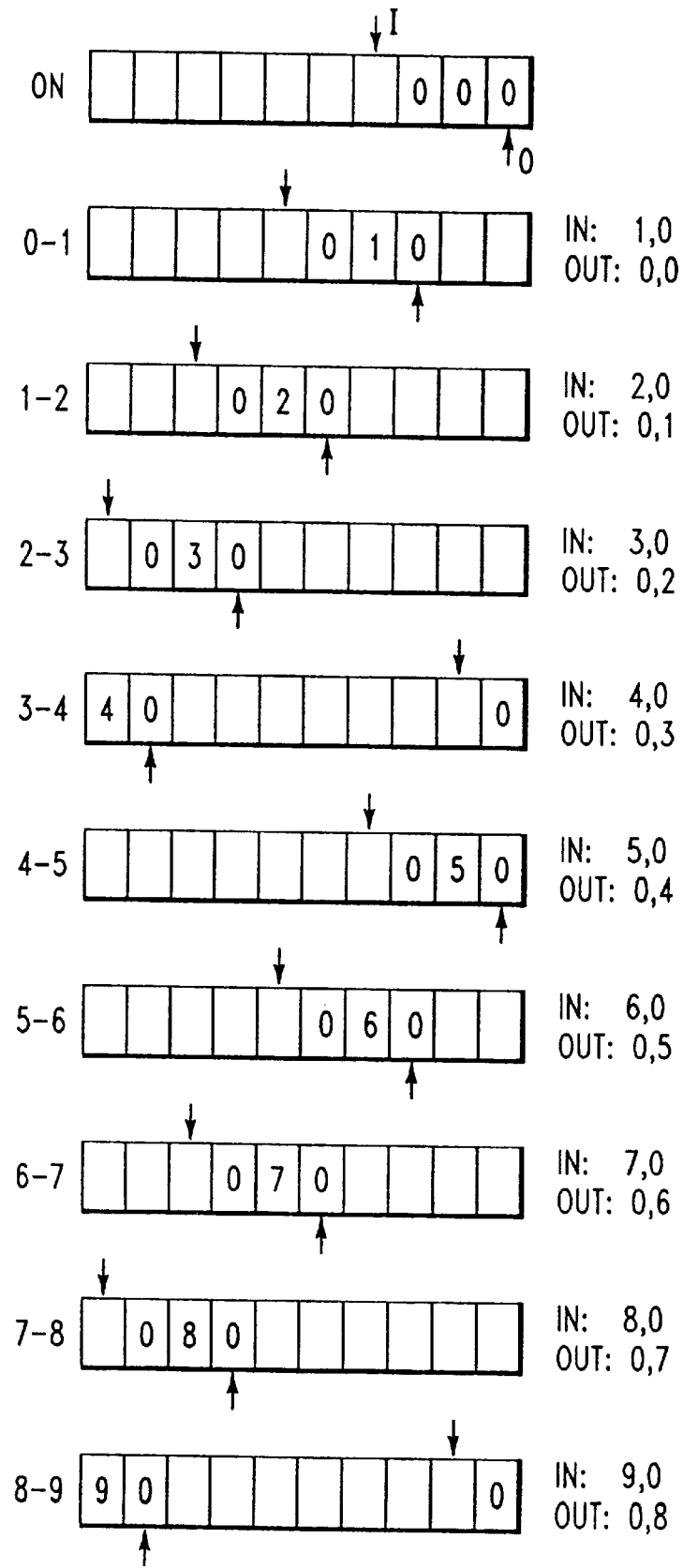
FIGS. 9–13 depict the output from the uniform transmitter packet buffer as a function of time corresponding to the packet timing diagram of FIGS. 4–8.

To aid in visualizing the contents of buffer 250 over time, FIGS. 9–13 depict the contents of buffer 250 corresponding to the time intervals in FIGS. 4–8. With reference to FIG. 9, there are shown 10 sets of partitioned blocks arranged from top-to-bottom; for instance, the top-most block has 10 sub-blocks partitioned left-to-right, wherein each sub-block represents a storage position in buffer 250. In the top-most block, the three null packets are shown by the juxtaposed set "0,0,0" representing the contents of buffer 250 immediately after system 100 is turned on. Also shown are an input (I) arrow pointer and an output (O) arrow pointer. The I pointer moves from right-to-left and points to the next available storage position in buffer 250 for which a packet is to be stored, whereas the O pointer moves from right-to-left and points to the first of a pair of packets that will be extracted from buffer 250 for delivery to channel 130 in the interval under consideration. The rate at which pointer O moves is twice as fast as the rate at which pointer I moves for this illustrative example. The set of sub-blocks below the top-most set depicts the interval (0–1); in this interval, packets 0,0 are transmitted, whereas packet 1 is stored, followed by the storage of a null packet produced by stuffer 270. At the end (0–1), buffer 250 stores packets "0,1,0" from right-to-left.

The contents of buffer 250 over the interval (0–9), in one second intervals, is shown in FIG. 9. For example, consider the interval (4–5) as being representative of each one second interval: during (4–5), packet 5 is stored, the packet pair 0,4 is delivered to switch 260, and a null packet is added after packet 5 is stored to pad the contents to the minimum of three stored packets. The I pointer points to the next storage location, and the O pointer points to the right-most null packet as the location to extract the next available packet pair.

Figure 4:
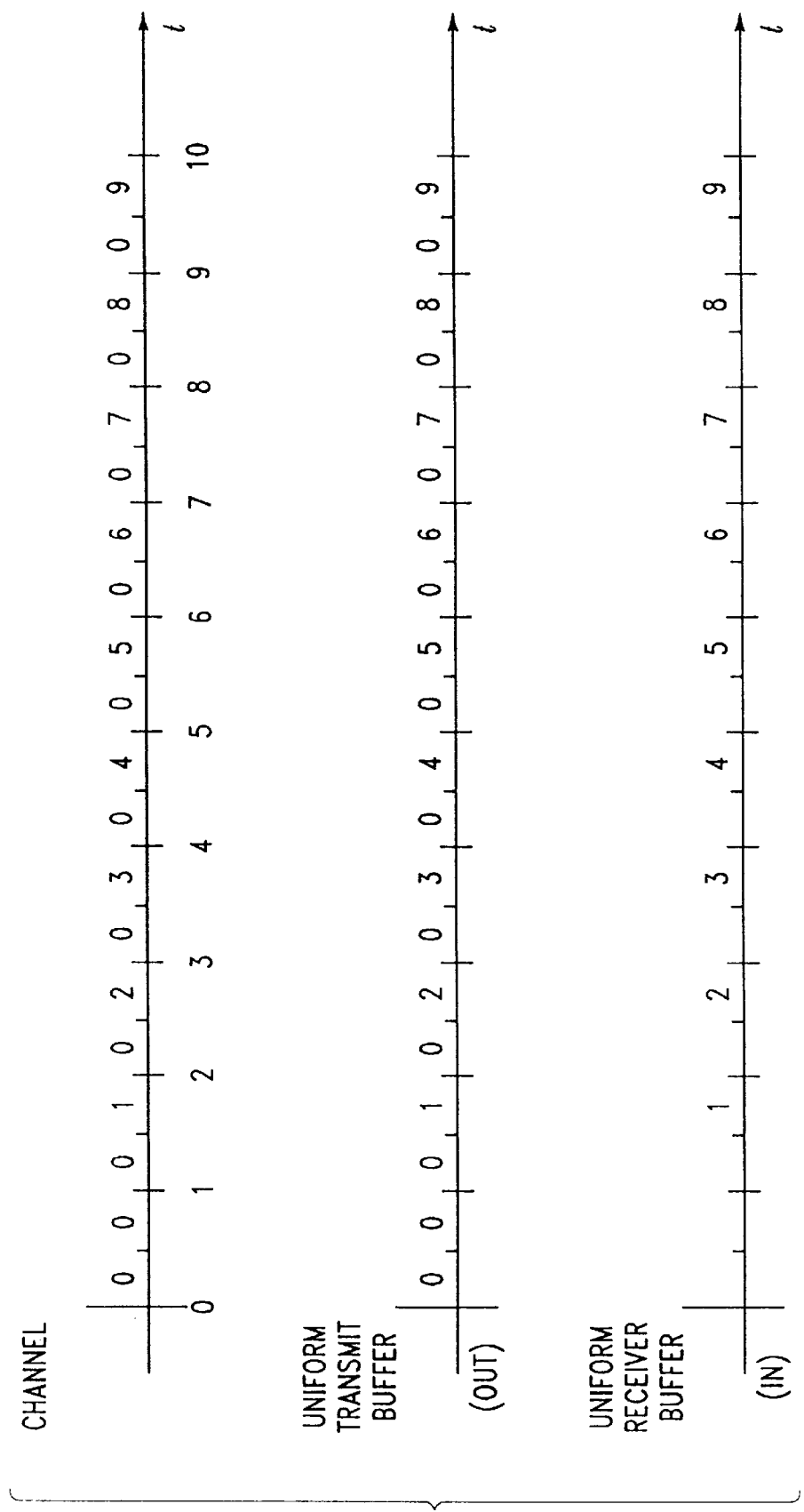
FIGS. 4–8 depict a packet timing diagram to show the generation of a single, interleaved packet stream for an illustrative embodiment in accordance with the present invention.

Now with reference to FIG. 4, the middle timing diagram depicts the output of uniform buffer 250 for the interval (0–10). Since uniform buffer 250 is connected through switch 260 and transmitter 120 to channel 130, then during the interval (0–10) channel 130 carries a signal indicative of the packet stream emitted by buffer 250 during (0–10). As a shorthand for expository purposes, the packets themselves are shown as appearing on channel 130 (although in practice the actual signal on channel 130 may propagate the packets in a suitable transmission format).

Corresponding to the timing diagram of channel 130 and buffer 250 is the flow diagram for packets arriving over channel 130 destined for uniform receiver buffer 330; this diagram is the bottom-most diagram in FIGS. 4–8. For simplicity, it is presumed that channel 130 does not introduce delays or latency, that is, propagation over channel 130 is assumed to be instantaneous. Of course in practice, channel 130 introduces delay, but such delay is readily accommodated by selecting appropriate lengths for packet buffers 250 and 330. In the interval (0–1), only null packets are received from channel 130, and these null packets are discarded by sorter 310. In (1–2), the null packet from the packet pair 0,1 is discarded, and only packet 1 is stored in uniform receiver buffer 330. Similarly, in (0–2), only packet 2 is stored. Thus, in (0–9), packet 1, packet 2, . . . , and packet 9 are stored in buffer 330.

To aid in visualizing the contents of buffer 330 over time, FIGS. 14–18 depict the contents of buffer 330 corresponding to the time intervals in FIGS. 4–8. The arrangement of FIGS. 14–18 is essentially the same as the arrangement of FIGS. 9–13. Thus, with reference to FIG. 14, there are shown 10 sets of partitioned blocks arranged from top-to-bottom; for instance, the top-most block has 11 sub-blocks partitioned left-to-right, wherein each sub-block represents a storage position in buffer 330. In the top-most block, there are no packets stored in buffer 250 immediately after system 100 is turned on. Also shown are an input (I) arrow pointer and an output (O) arrow pointer. The I pointer moves from right-to-left and points to the next available storage position in buffer 330 for which a packet is to be stored, whereas the O pointer moves from right-to-left and points to the packet that will be extracted from buffer 330 for delivery to uniform receiver 350 in the interval under consideration. The set of sub-blocks below the top-most set depicts the interval (0–1); in this interval, packet 1 is stored by buffer 330. The contents of buffer 330 over (0–10) are summarized by FIG. 14.

Figure 15:
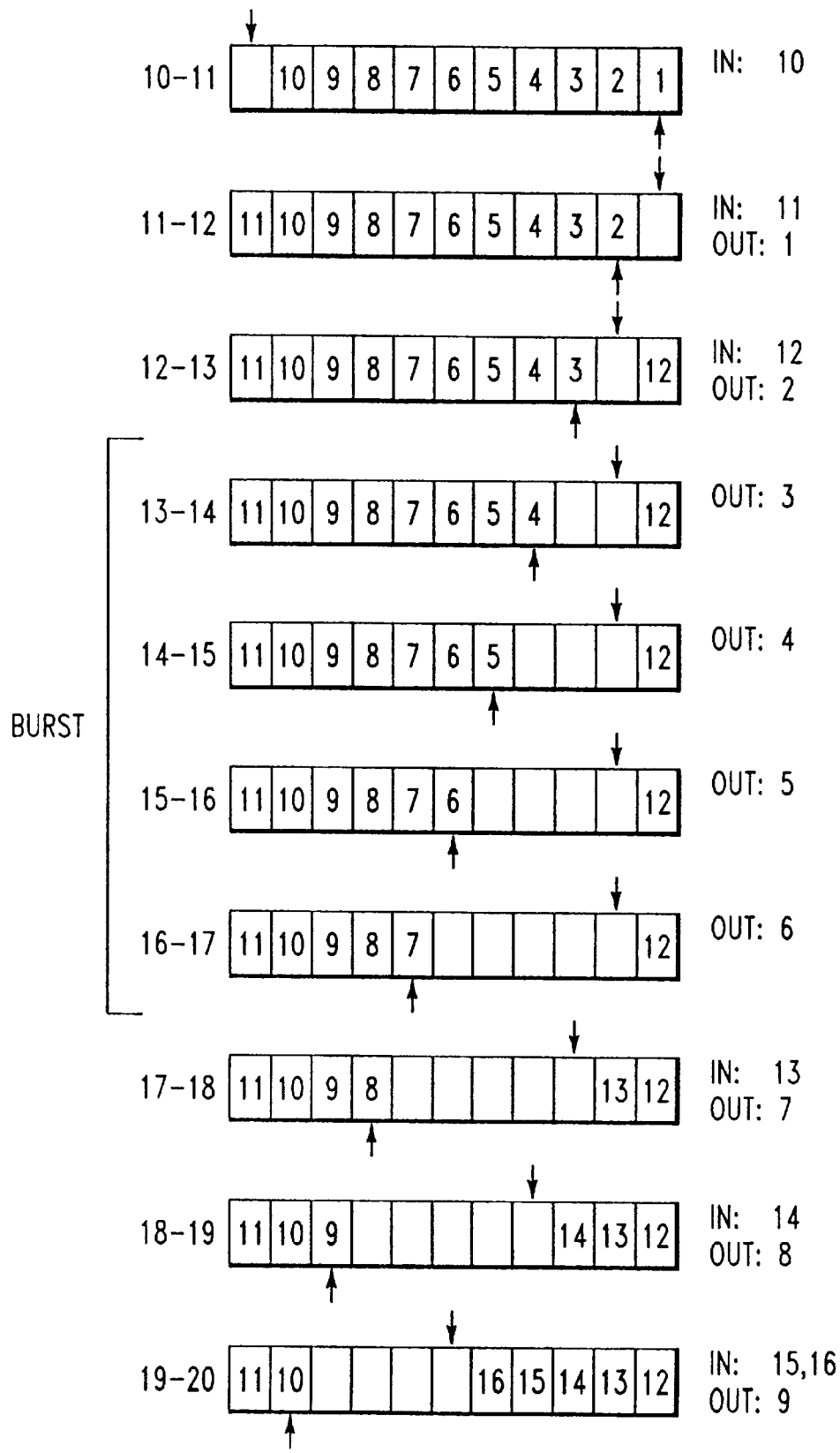
Figure 16:
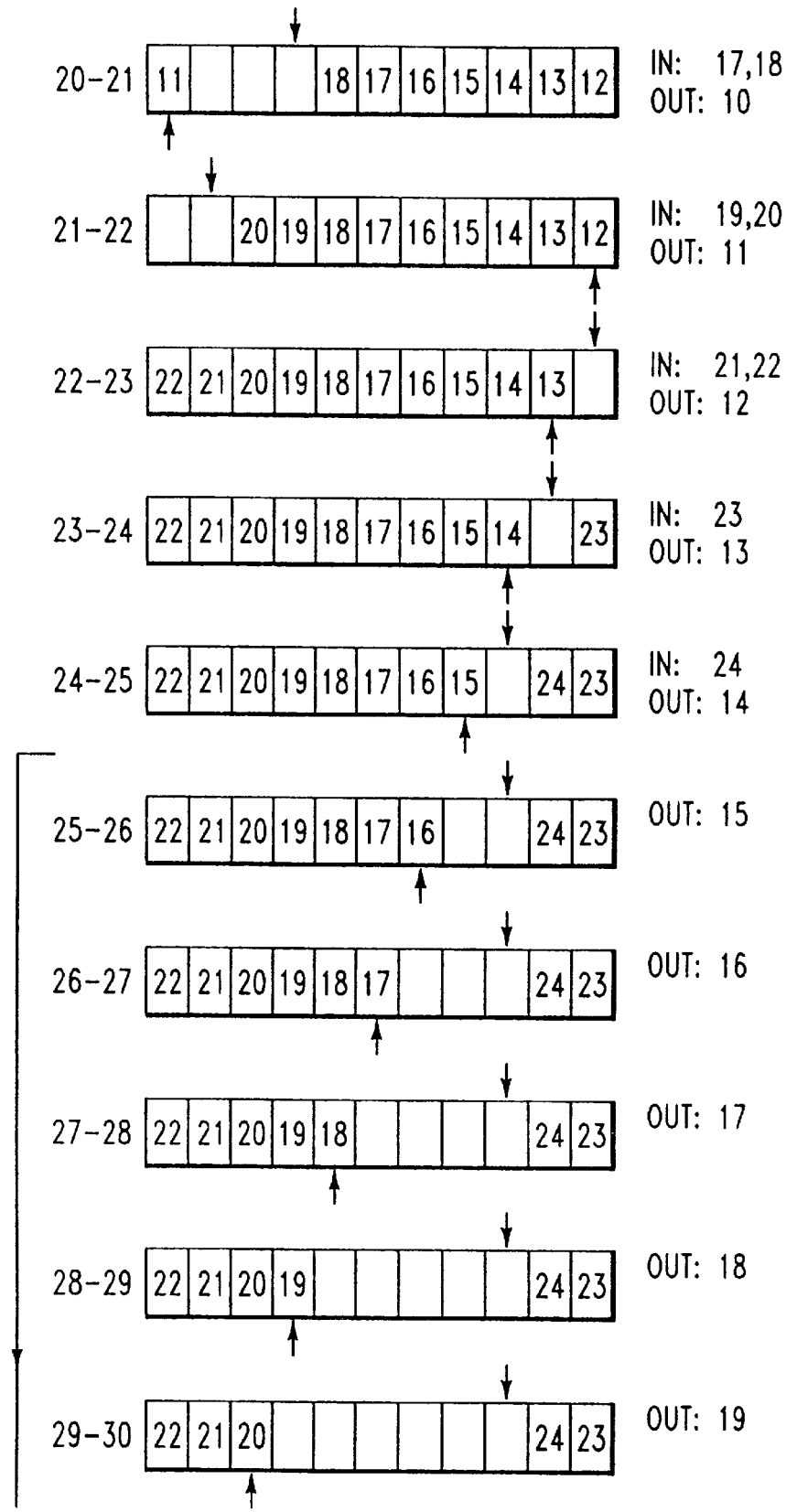
Figure 17:
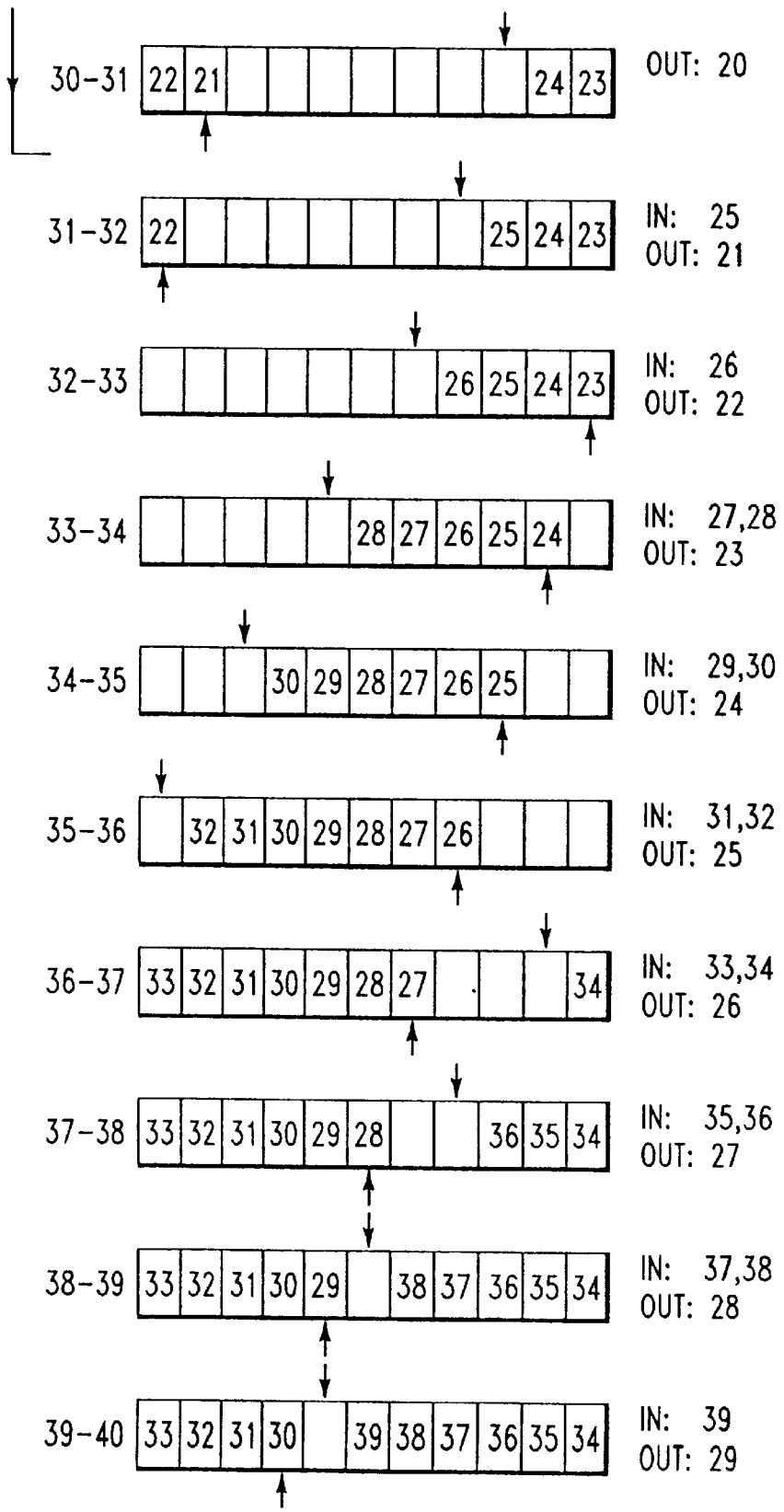

System 100 is configured so that burst buffer 240 is not accessed until uniform receiver buffer 330 has stored ten packets, that is, buffer 330 is essentially full so that transmission of packets to the customer may continue uninterrupted. Uniform transmit buffer 250 keeps track of the number of packets that have been extracted from it, and therefore can register when uniform receiver buffer 330 is full. The interval by which receiver buffer 330 is basically filled is shown in FIG. 15 by (10–11), that is, ten packets have been stored with only one storage location remaining to be filled. At this time, access to burst buffer 240 is enabled. Accordingly, the storage-transmit pattern for buffer 250 continues to unfold in time as exemplified by each one-second interval in FIG. 9 and the one-second intervals in (9–13) of FIG. 10, and after interval (10–11) a burst received by system 100 over stream 101 and stored in burst buffer 240 may be transmitted.

Figure 10:
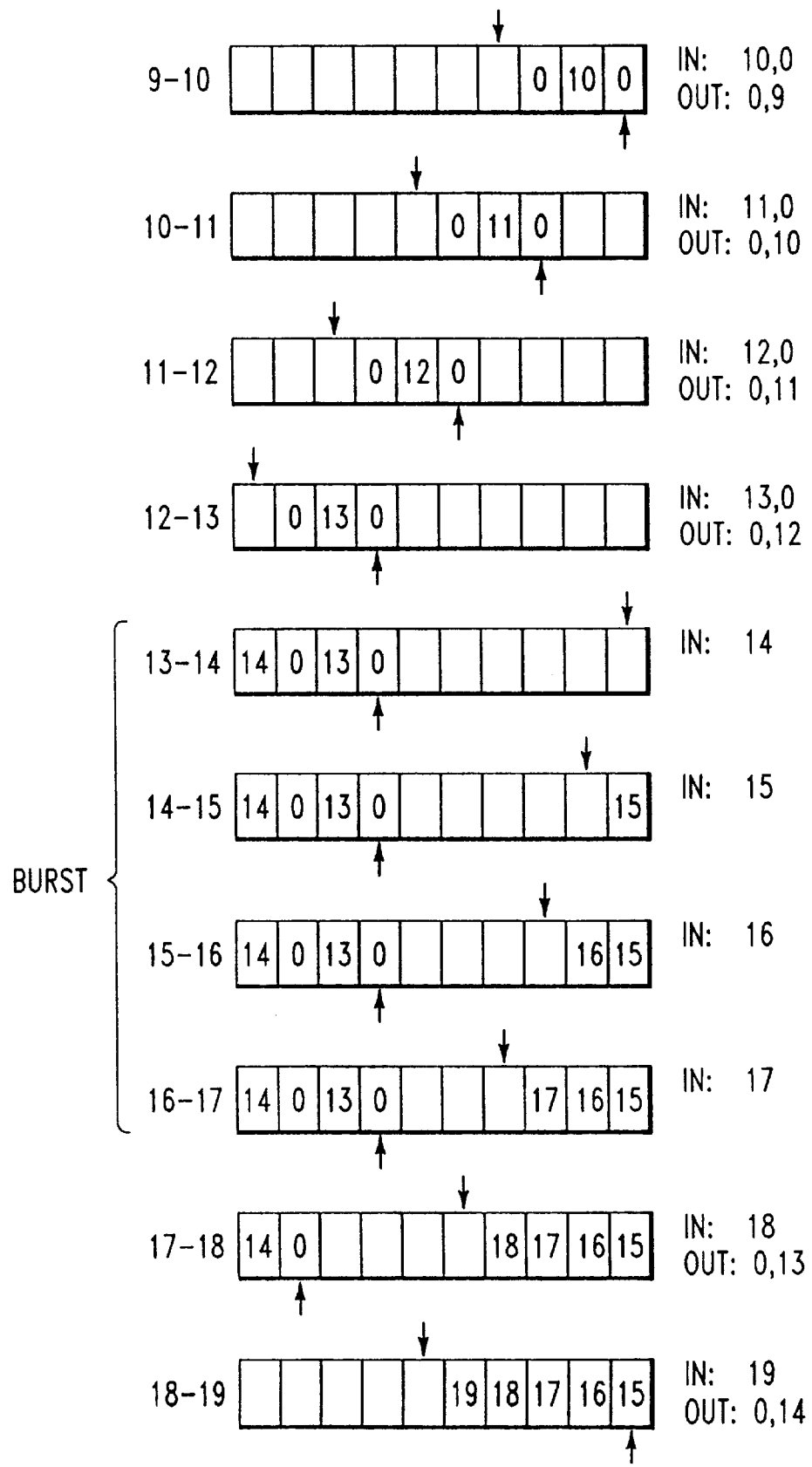

An example of the hiatus in the foregoing pattern is depicted in FIG. 10. During the interval (13–17) of FIG. 10, burst buffer 240 has bursty packets stored and available for transmission over channel 130. Switch 260 is connected to bursty buffer 240 to emit the stored packets over channel 130, as depicted by the timing diagram of FIG. 5. Again, with reference to FIG. 10, during (13–17), packets are not transmitted from uniform buffer 250 and only incoming packets are stored. For instance, during (13–14), packet 14 is stored, the I pointer moves but the O pointer remains fixed. Similarly, during (14–15), packet 15 is stored, the I pointer moves and the O pointer remains fixed. For the interval under consideration, bursty buffer 240 empties in 4 seconds, that is, the 6 second maximum allowable hiatus is not invoked.

Figure 5:
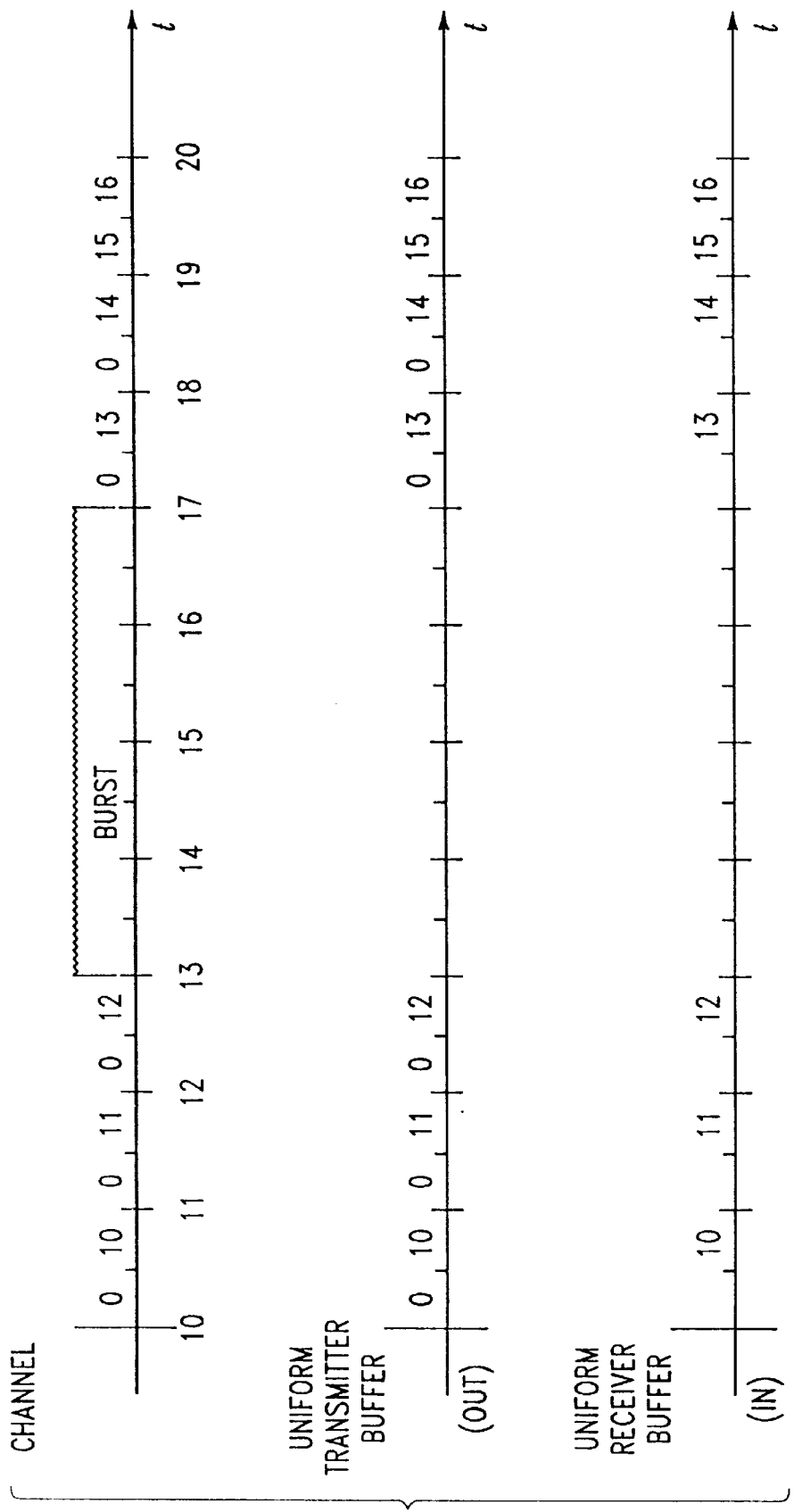

The timing diagram of FIG. 5 shows that no packets are extracted from buffer 250 during the interval (13–17), so that no packets are received by uniform receiver buffer 330 during this same interval. It is clear that uniform buffer 250 is filling during this interval (FIG. 10), and uniform receiver buffer 330 is being depleted during this interval (FIG. 15). It is also clear that both the filling of uniform transmitter buffer 250 and the emptying of uniform receiver buffer 330 are controlling events to the operation of system 100— buffer 250 cannot fill to the point where incoming packets supplied by stream 102 are discarded, nor can buffer 330 be fully depleted so that no packet is available for delivery to the customer. The parameters of system 100, such as buffer sizes and the maximum burst interval, are set to ensure that buffer 250 cannot fill and buffer 330 is never empty.

Figure 11:
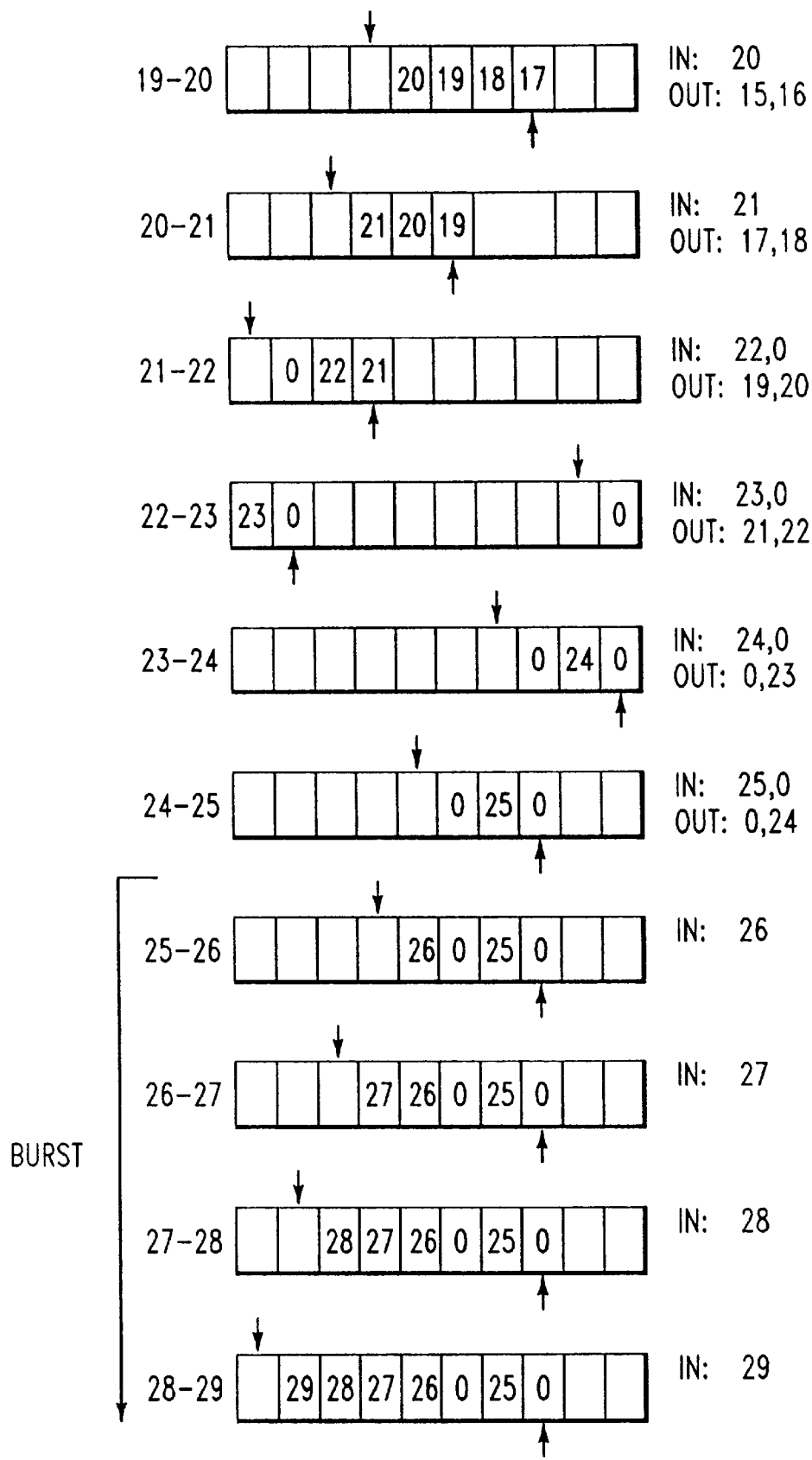

After burst buffer 240 is emptied at 17 seconds, switch 260 is switched to accept packets from uniform transmitter buffer 250. Now, besides accepting each incoming packet, packet pairs are once again emitted by buffer 250. For example, with reference to FIG. 10, in the interval (17–18), packet 18 is stored, and packet pair 0,13 is transmitted. With reference to FIG. 11, during the interval (20,21), packet 21 is stored, and packet pair 17,18 is transmitted. Since during the interval (13–21) there are at least three actual packets stored from incoming stream 102, there is no need to store null packets. However, during interval (21–22), the transient effect caused by the burst has been completed, that is, buffer 250 now stores only the incoming packet and two stuffed, null packets. Moreover, with reference to FIG. 16, uniform receiver buffer 330 has been replenished so that it is filled with ten packets at the end of (22–23). The timing diagram of FIG. 6 depicts the packets on channel 130, the packets extracted from buffer 250, and the packets received by buffer 330 in the foregoing intervals.

Figure 6:
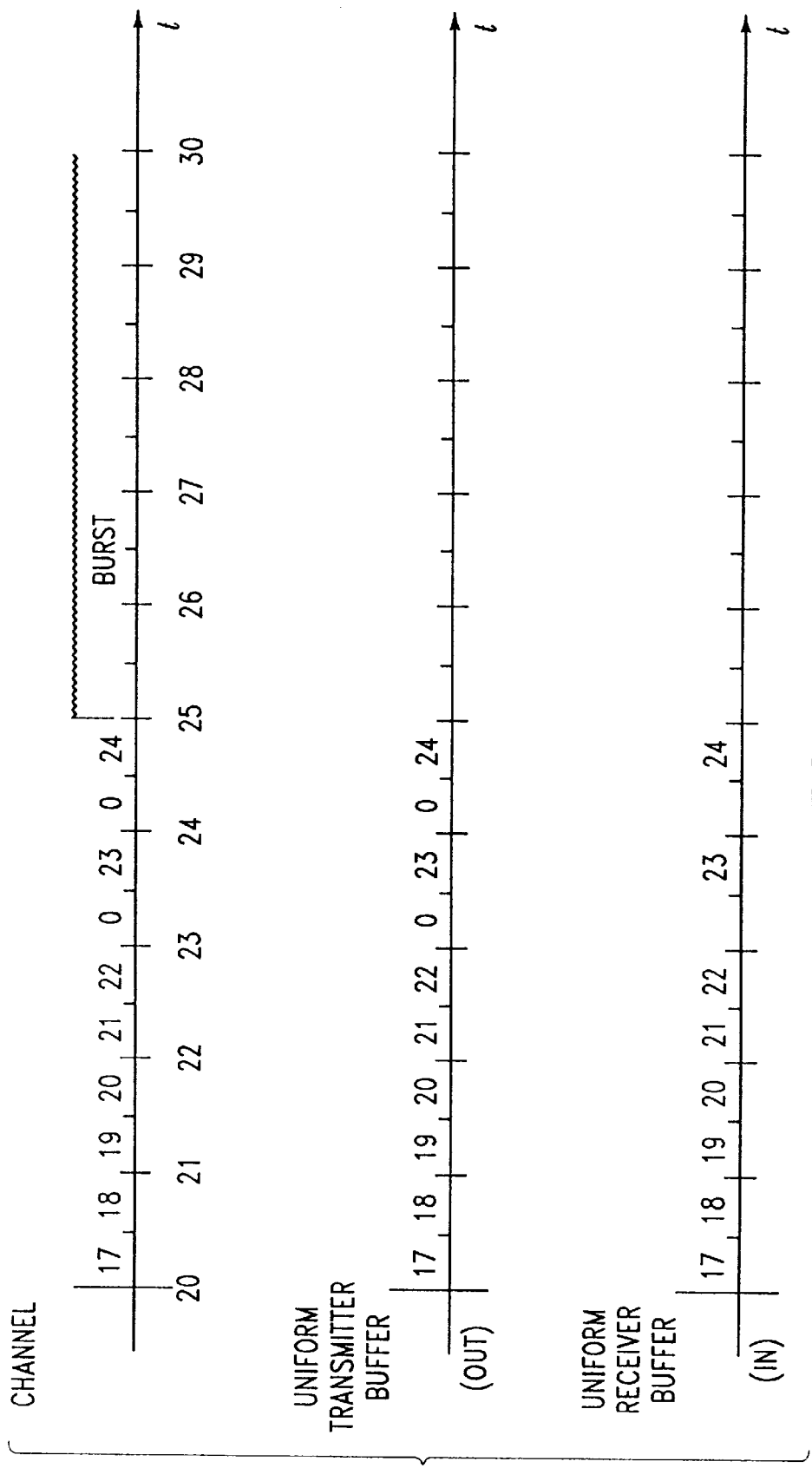
Figure 12:
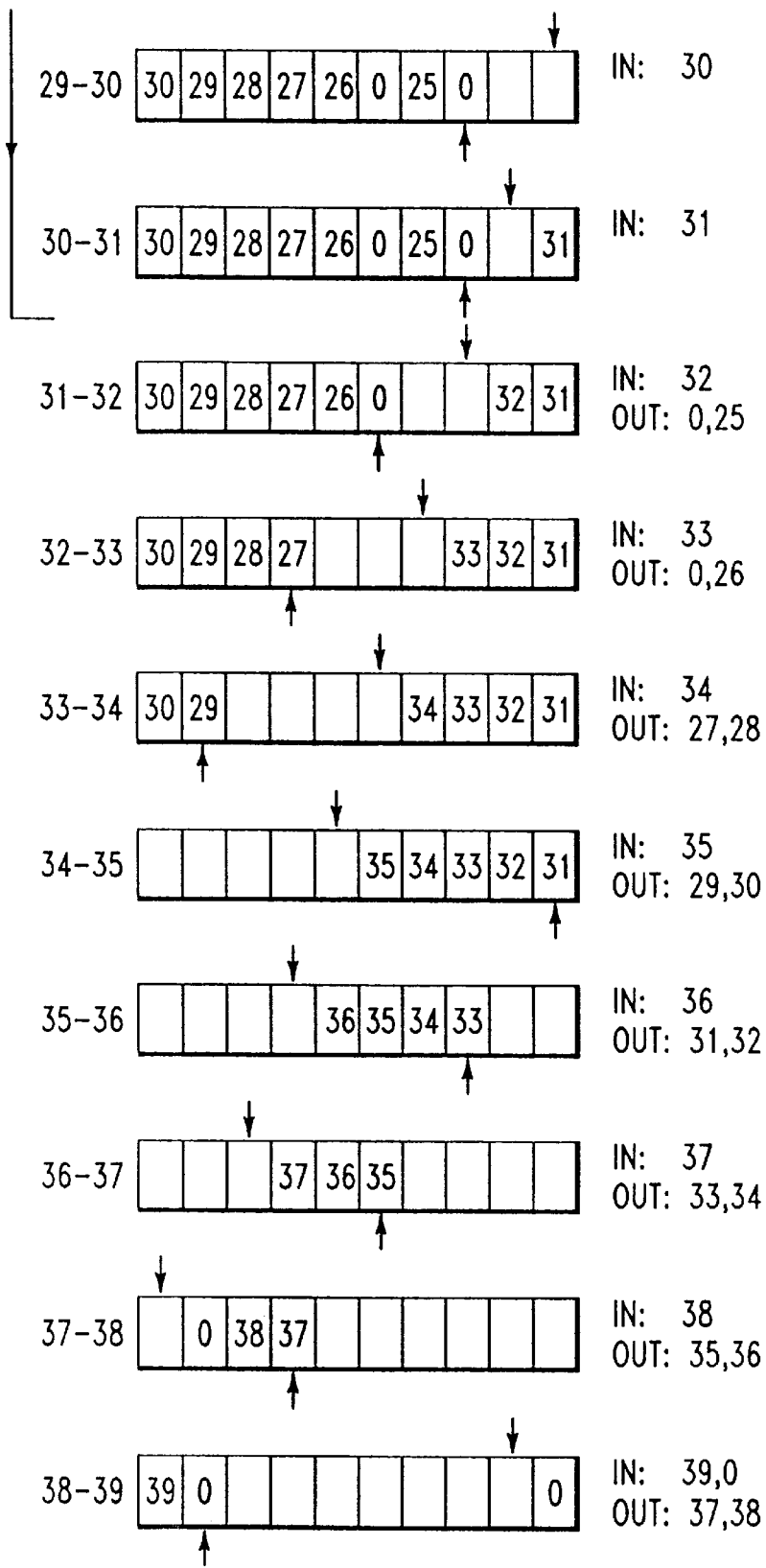
Figure 13:
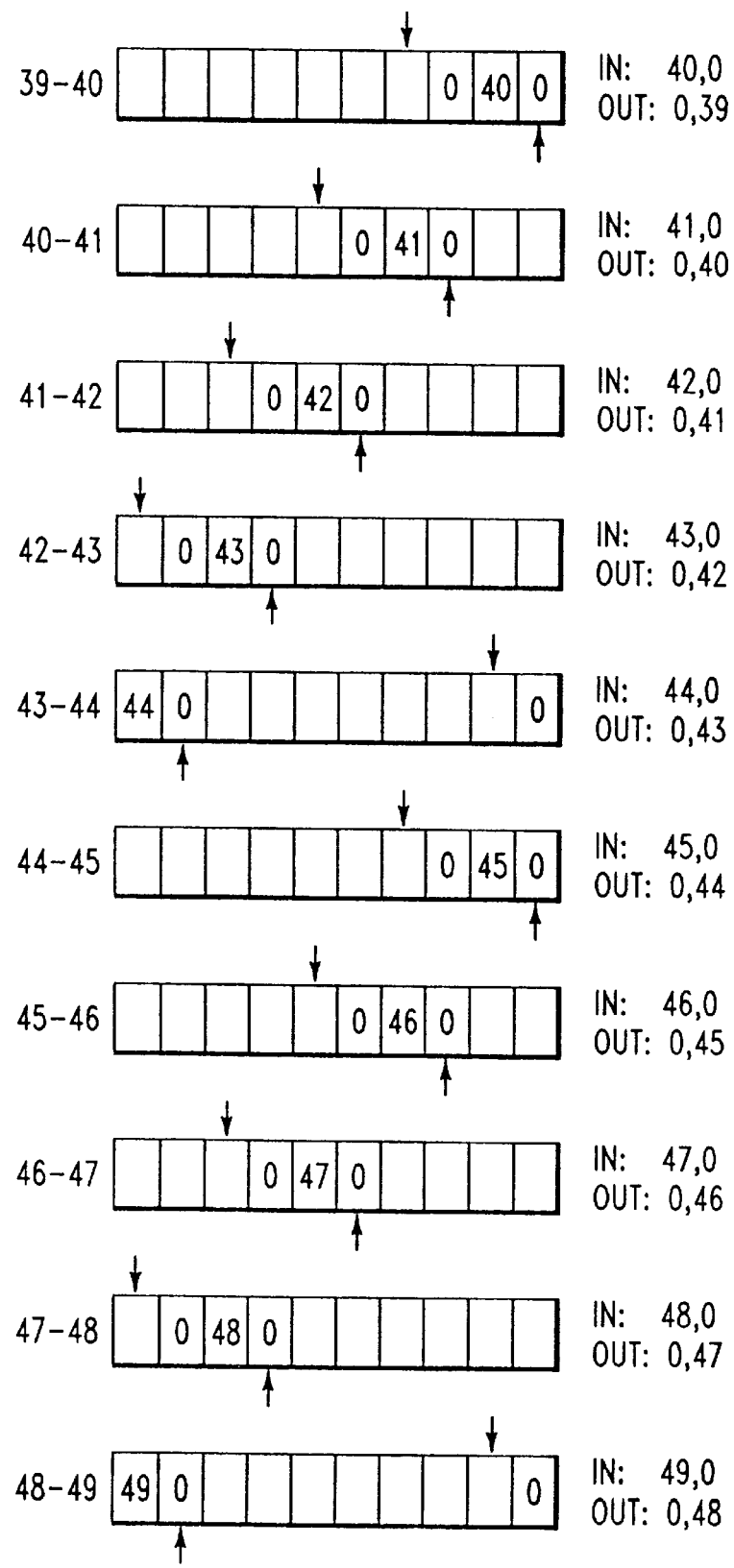
Figure 14:
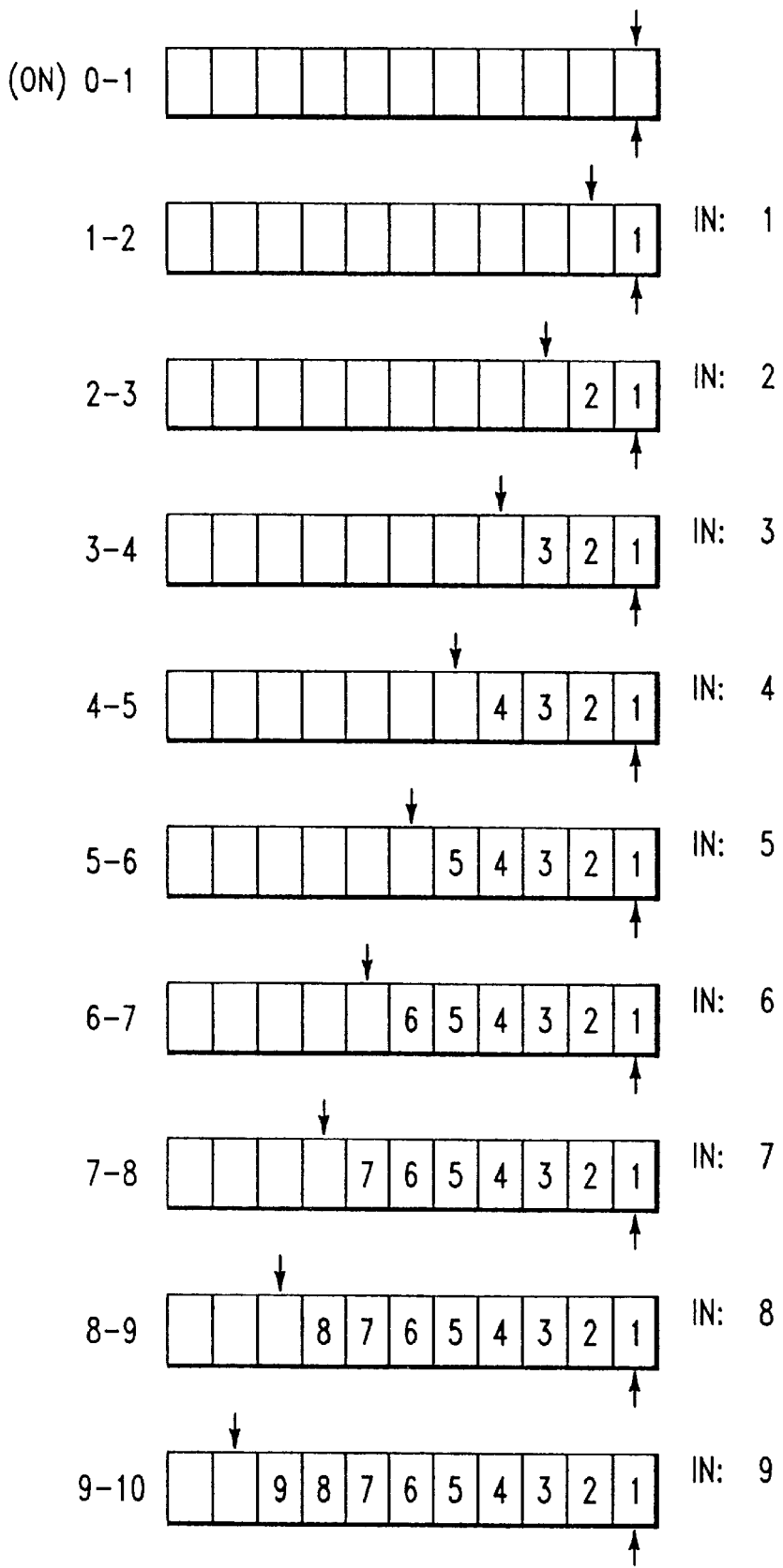
FIGS. 14–18 depict the input to the uniform receiver packet buffer as a function of time corresponding to the packet timing diagram of FIGS. 4–8.
Figure 18:
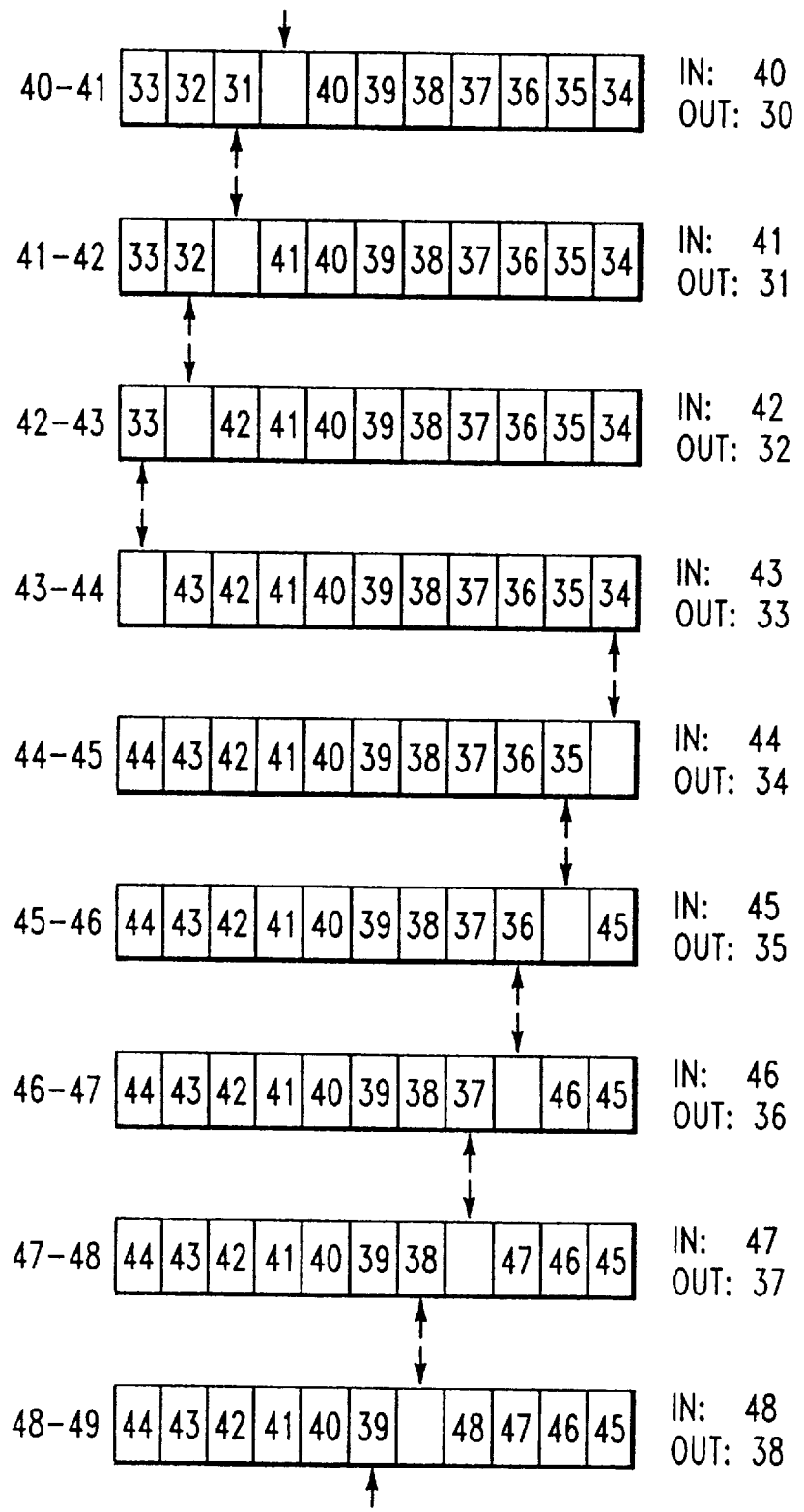

Referring now to FIGS. 6 and 7, the next burst to be transmitted arrives in the interval (25–31). This burst duration is 6 seconds, and is representative of the maximum burst allowed for this illustrative system. The contents of buffer 250 during the interval (25–31) are shown in FIGS. 11 and 12. As is the case with the first burst in the interval (13–17), only incoming packets are stored in buffer 250; no packets are transmitted to the receiving end of system 100. Similarly, with reference to FIGS. 16 and 17, packet buffer 330 empties to the point only four packets remain in buffer 330. As further shown in FIG. 17, buffer 330 finally fills in (38–39), that is, it takes 8 seconds to fill buffer 330 following the end of the latest burst. The contents of buffer 250 during the interval following the burst until (38–39) are shown FIG. 12; FIG. 13 completes the example to show the manner in which steady-state is achieved after the latest burst. Similarly, FIG. 18 shows intervals corresponding to FIG. 13, and illustrates the contents of buffer 330 during the intervals of interest. Finally, FIGS. 8 and 9 show the timing diagrams for the intervals following the latest burst.

Figure 19:
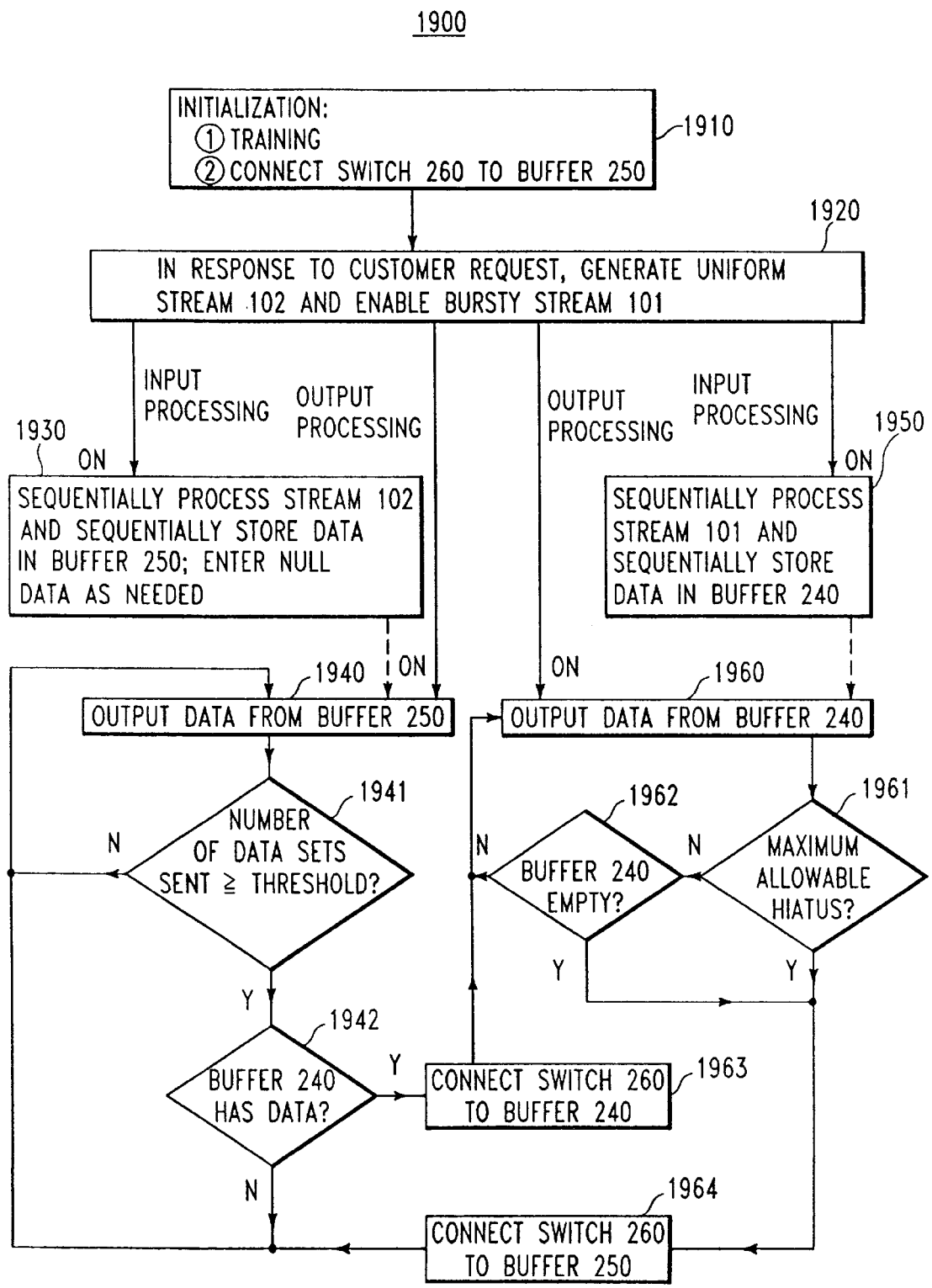
FIG. 19 is a flow diagram for the transmitter processes of the system in accordance with the present invention.

With the understanding gained from the description of this illustrative example, elucidation of the general process flow diagram 1900 for the transmitter end of system 100 (in particular, transmitter buffer 110 and transmitter 120) depicted in FIG. 19 is facilitated. Referring to FIG. 19, processing block 1910 depicts the initialization phase for both transmitter buffer 110 and transmitter 120 wherein system 100 is "turned on" to effect the training cycle for transmitter 120 and switch 260 is connected to uniform transmitter buffer 250. As represented by processing block 1920, in response to a customer request (which generally arrives over an independent communication path), bursty input stream 101 is enabled to feed bursty information to burst buffer 240, and uniform information is generated and then supplied over uniform stream 102 to uniform buffer 250. Block 1920 invokes both input processing and output processing for the bursty and uniform propagation paths in transmitter buffer 110. With respect to the input processing of uniform stream 102, processing block 1930 sequentially processes uniform data (e.g., packets) arriving on input stream 102 and sequentially stores data in buffer 250; moreover, null data is entered into buffer 250 whenever the data stored is less than a prescribed threshold. Similarly, with respect to the input processing of bursty stream 101, processing block 1950 sequentially processes bursty data (e.g., packets) arriving on input stream 101 and sequentially stores data in buffer 240.

With respect to output processing for both the uniform and bursty paths, these paths are described together since they are interdependent. Initially, processing block 1940 is invoked to output data (e.g., one packet) from uniform buffer 250 for delivery to switch 260 which is connected to buffer 250 via signal path 252 (see FIG. 2). Next, decision block 1941 is entered to determine if the amount of data transmitted from buffer 250 is above a predetermined threshold. If the amount of data transmitted is less than the amount required to fill uniform receiver buffer 330, then processing by block 1940 is again invoked to output another set of data. Information about the amount of data required by the uniform receiver buffer 230 is known at the transmitter by, for example, keeping track of the number of data sets stored during each hiatus in the flow of uniform data from the uniform data buffer 250. Thus, both the maximum allowable hiatus as well as a minimum time between hiatuses are controlled by looping through processing blocks 1940 and 1941 as needed.

Once the predetermined threshold has been reached, processing by decision block 1942 is enabled to determine if bursty buffer 240 has any stored data. If not, then processing block 1940 is again invoked. If buffer 240 has stored data, then processing block 1963 is enabled to connect switch 260 to buffer 240 via signal path 242 (see FIG. 2). After this path is established, processing block 1960 is entered to output a data set (e.g., one packet) from buffer 240 for delivery to switch 260. After each the data set is transmitted, decision block 1961 is entered to determine if the maximum allowable number of bursty data sets for this processing hiatus has been emitted. If so, then switch 260 is reconnected to uniform buffer 250, as shown by processing block 1964, and processing continues from block 1940. If the maximum number of data sets has not been reached, then processing by decision block 1962 is invoked to determine if bursty buffer 240 is empty. If so, then switch 260 is reconnected to uniform buffer 250, as shown by processing block 1964, and processing continues from block 1940. If bursty buffer 240 is not empty, then block 1960 is again invoked to output another bursty data set.

In accordance with the present invention, the inventive subject matter is embodied in the structure and methodology of the transmitter buffer and concomitant receiver buffer. Although these buffers have been described in the illustrative example in terms of processing packets, it is readily appreciated by one of ordinary skill in the art that packetizing is not absolutely necessary—packets were deployed in the foregoing description for concreteness and to provide a degree of specificity to the illustrative embodiments. In general then system 100 processes data arranged in any format convenient for the technological application.

Moreover, although the interdependent transmit and receive buffers must be designed to accommodate the rates of the bursty and uniform data streams and the rate of the channel, the design of the channel transmission format, including characteristics and/or parameters for propagation of the single data stream over channel 130, is virtually irrelevant.

In addition, the principles described herein may be readily generalized by one of ordinary skill in the art to include the combining of more than two different services. For example, there might be more than one bursty data stream, with different priorities, with the lower priority stream being transmitted only when there is no higher priority bursty data to be transmitted. Even more generally, buffering of the bursty channel could accommodate bus transmission of bursty data from several sources with different formats. On the other hand, several different sources of uniform data could be accommodated on a suitable generalization of system 100, each with their own data rates and delay sensitivities.

Also, the packetizers 210 and 220 may strip destination and other protocol information from the incoming packets, changing the amount of information in each packet, if needed, and adding protocol information to the packets that will be transmitted to the receiving terminal—included in the protocol is a packet type identifier which may be used advantageously by receiver separator 340.

Finally, null packets may be used for information transfer purposes, such as propagating control information. Then receiver 150 would be arranged with a null packet buffer in parallel with bursty and uniform buffers 320 and 330, respectively, to parse the null packets for control or other information propagated by each null packet.

Although various embodiments which incorporate the teachings of the present invention have been shown and described in detail herein, those skilled in the art can readily devise many other varied embodiments that still incorporate these teachings.

I claim:

1. A system for communicating both a uniform data stream and a bursty data stream over a communication medium having a fixed capacity, the system comprising
   a transmitter for buffering the uniform data stream and the bursty data stream, for interleaving the uniform data stream and the bursty data stream into an interleaved data stream, and for propagating the interleaved data stream over the medium, the interleaved data stream being composed of contiguous time intervals wherein the uniform data stream transmits at the fixed capacity during at least one of a first subset of the time intervals, and wherein the bursty data transmits at the fixed capacity during at least one of a second subset of the time intervals exclusive of the first subset, and
   a receiver, coupled to the medium, for processing the interleaved data stream to separate the uniform data stream and the bursty data stream.

2. The system as recited in claim 1 wherein the transmitter further includes
   a uniform transmitter buffer for storing the uniform data stream during the time intervals of the second subset,
   a data stuffer for storing null data in the uniform buffer whenever the contents of the uniform buffer are less than a predetermined threshold,
   a bursty transmitter buffer for storing the bursty data stream during time intervals of the first subset,
   a switch coupled to the uniform transmitter buffer and the bursty transmitter buffer, and
   a controller, coupled to the uniform transmitter buffer and the bursty transmitter buffer, for switching the switch between the uniform transmitter buffer and the bursty transmitter buffer as determined by the contents of the uniform transmitter buffer and the bursty transmitter buffer to generate the interleaved data stream for delivery to the medium, the interleaved data stream being composed of interleaved portions of the uniform data stream, including null data, if any, and the bursty data stream,
     wherein the switch is connected to the uniform transmitter buffer and the medium to transmit the next available stored uniform data from the uniform transmitter buffer onto the medium for as long as the amount of uniform data transmitted onto the medium is less than a predetermined threshold, and
     wherein the switch is connected to the bursty transmitter buffer and the medium to transmit the next available stored bursty data from the bursty transmitter buffer onto the medium whenever the bursty transmitter buffer has stored bursty data and the amount of bursty data transmitted onto the medium is less than a prescribed threshold.

3. A system for communicating both a uniform data stream and a bursty data stream over a communication medium, the system comprising
   a transmitter for interleaving the uniform data stream and the bursty data stream into an interleaved data stream, and for propagating the interleaved data stream over the medium, and
   a receiver, coupled to the medium, for processing the interleaved data stream to separate the uniform data stream and the bursty data stream,
   said transmitter including
     a uniform buffer for storing the uniform data stream,
     a data stuffer for storing null data in the uniform buffer whenever the contents of the uniform buffer are less than a predetermined threshold,
     a bursty buffer for storing the bursty data stream,
     a switch coupled to the uniform buffer and the bursty buffer, and
     a controller, coupled to the uniform buffer and the bursty buffer, for switching the switch between the uniform buffer and the bursty buffer as determined by the contents of the uniform buffer and the bursty buffer to generate the interleaved data stream for delivery to the medium, the interleaved data stream being composed of interleaved portions of the uniform data stream, including null data, if any, and the bursty data stream,
       wherein the uniform data stream propagates at a first data rate, the communication medium transmits data at a second data rate, and the uniform buffer operates at the first data rate at its input and the second data rate at its output.

4. The system as recited in claim 2 wherein the receiver includes
   a data separator for separating the interleaved data stream into a uniform received data stream and a bursty received data stream,
   a uniform receiver buffer for storing the uniform received data stream wherein the uniform receiver buffer has a storage capacity greater than or equal to a storage capacity of the uniform transmitter buffer,
   a bursty receiver buffer for storing the bursty received data stream, and
   a uniform receiver, coupled to the uniform receiver buffer, for delivering the uniform data stream to a customer at a predetermined rate.

5. The system as recited in claim 1
wherein the transmitter includes
   a uniform transmitter buffer for storing the uniform data stream during the time intervals of the second subset,
   a data stuffer for storing null data in the uniform buffer whenever the contents of the uniform buffer are less than a predetermined threshold,
   a bursty transmitter buffer for storing the bursty data stream during time intervals of the first subset,
   a switch coupled to the uniform transmitter buffer and the bursty transmitter buffer, and
   a controller, coupled to the uniform transmitter buffer and the bursty transmitter buffer, for switching the switch between the uniform transmitter buffer and the bursty transmitter buffer as determined by the contents of the uniform transmitter buffer and the bursty transmitter buffer to generate the interleaved data stream for delivery to the medium, the interleaved data stream being composed of interleaved portions of the uniform data stream, including null data, if any, and the bursty data stream, wherein the switch is connected to the uniform transmitter buffer and the medium to transmit the next available stored uniform data from the uniform transmitter buffer onto the medium for as long as the amount of uniform data transmitted onto the medium is less than a predetermined threshold, and wherein the switch is connected to the bursty transmitter buffer and the medium to transmit the next available stored bursty data from the bursty transmitter buffer onto the medium whenever the bursty transmitter buffer has stored bursty data and the amount of bursty data transmitted onto the medium is less than a prescribed threshold; and wherein the receiver includes
- a data separator for separating the interleaved data stream into a uniform received data stream and a bursty received data stream,
- a uniform receiver buffer for storing the uniform received data stream wherein the uniform receiver buffer has a storage capacity greater than or equal to a storage capacity of the uniform transmitter buffer,
- a bursty receiver buffer for storing the bursty received data stream, and
- a uniform receiver, coupled to the uniform receiver buffer, for delivering the uniform received data stream to a customer.

6. A transmitter for simultaneously processing both an incoming uniform data stream and an incoming bursty data stream for propagation over a transmission medium, the transmitter comprising a uniform buffer for storing the uniform data stream, a data stuffer for storing null data in the uniform buffer whenever the contents of the uniform buffer are less than a predetermined threshold, a bursty buffer for storing the bursty data stream, a switch coupled to the uniform buffer and the bursty buffer, and a controller, coupled to the uniform buffer and the bursty buffer, for switching the switch between the uniform buffer and the bursty buffer as determined by the contents of the uniform buffer and the bursty buffer to generate an interleaved data stream for delivery to the medium, the interleaved data stream being composed of interleaved portions of the uniform data stream, including null data, if any, and the bursty data stream, wherein the switch is connected to the uniform buffer and the medium to transmit the next available stored uniform data from the uniform buffer onto the medium for as long as the amount of uniform data transmitted onto the medium is less than a predetermined threshold, and wherein the switch is connected to the bursty buffer and the medium to transmit the next available stored bursty data from the bursty buffer onto the medium whenever the bursty buffer has stored bursty data and the amount of bursty data transmitted onto the medium is less than a prescribed threshold.

7. A transmitter for simultaneously processing both an incoming uniform data stream and an incoming bursty data stream for propagation over a transmission medium, the transmitter comprising a uniform buffer for storing the uniform data stream, a data stuffer for storing null data in the uniform buffer whenever the contents of the uniform buffer are less than a predetermined threshold, a burst buffer for storing the bursty data stream, a switch coupled to the uniform buffer and the burst buffer, and a controller, coupled to the uniform buffer and the bursty buffer, for switching the switch between the uniform buffer and the bursty buffer as determined by the contents of the uniform buffer and the bursty buffer to generate an interleaved data stream for delivery to the medium, the interleaved data stream being composed of interleaved portions of the uniform data stream, including null data, if any, and the bursty data stream, wherein the uniform data stream propagates at a first data rate, the medium transmits data at a second data rate, and the uniform buffer operates at the first data rate at its input and the second data rate at its output.

8. A receiver for processing an incoming data strewn composed of interleaved portions of a uniform data stream and a bursty data stream, the receiver comprising a data separator for separating the incoming data stream into a uniform received data stream and a burst received data stream, a uniform buffer for storing the uniform received data stream, a bursty buffer for storing the burst received data stream, and a uniform receiver, coupled to the uniform buffer, for outputting the uniform data stream at a predetermined uniform rate, wherein the medium transmits data at a medium data rate and the uniform receiver buffer operates at the medium data rate at its input and the predetermined data rate at its output.

9. A method for communicating both a uniform data stream and a bursty data stream over a communication medium of fixed capacity, the method comprising the steps of buffering the uniform data stream and the bursty data stream, interleaving the uniform data stream and the bursty data stream into an interleaved data stream, propagating the interleaved data stream over the medium, the interleaved data stream being composed of contiguous time intervals wherein the uniform data stream propagates at the fixed capacity during at least one of a first subset of the time intervals, and wherein the bursty data propagates at the fixed capacity during at least one of a second subset of the time intervals exclusive of the first subset, and processing the interleaved data stream received over the medium to separate the uniform data stream and the bursty data stream.

10. The method as recited in claim 9 wherein the step of interleaving includes the steps of storing the uniform data stream in a uniform buffer during the time intervals of the second subset, stuffing a null data in the uniform buffer whenever the contents of the uniform buffer are less than a predetermined threshold, connecting both the uniform buffer and the bursty buffer to a switch, and switching the switch between the uniform buffer and the bursty buffer as determined by the contents of the uniform buffer and the bursty buffer to generate the interleaved data stream for delivery to the medium, the interleaved data stream being composed of interleaved portions of the uniform data stream, including null data, if any, and the bursty data stream, wherein the switch is connected to the uniform buffer and the medium to transmit the next available stored uniform data from the uniform buffer onto the medium for as long as the amount of uniform data transmitted onto the medium is less than a predetermined threshold, and wherein the switch is connected to the bursty buffer and the medium to transmit the next available stored bursty data from the bursty buffer onto the medium whenever the bursty buffer has stored bursty data and the amount of bursty data transmitted onto the medium is less than a prescribed threshold.

11. A method for interleaving a uniform data stream and a bursty data stream into an interleaved data stream for transmission over a communications medium, the method comprising the steps of (a) sequentially processing the uniform data stream to produce uniform stream data sets and storing the uniform stream data sets into a uniform transmitter buffer, (b) sequentially processing the bursty data stream to produce bursty data sets and storing the bursty data sets into a bursty transmitter buffer, (c) transmitting the next available uniform data set from the uniform transmitter buffer onto the medium, (d) if the number of uniform data sets transmitted onto the medium is less than a predetermined threshold, then returning to step (c); otherwise, proceeding to step (e), (e) if the bursty transmitter buffer has stored bursty data sets, proceeding to step (f); otherwise, returning to step (c), (f) transmitting the next available bursty data set from the bursty transmitter buffer onto the medium, (g) if the number of bursty data sets transmitted onto the medium is less than a prescribed threshold, proceeding to step (h); otherwise, returning to step (c), and (h) if the bursty transmitter buffer is empty, returning to step (c); otherwise, returning to step (f).

12. A method for interleaving a uniform data stream and a bursty data stream in a transmitter to generate an interleaved data stream for propagation over a communications medium, and for processing the interleaved data stream in a receiver, wherein in the transmitter the method comprises the steps of (a) sequentially processing the uniform data stream to produce uniform stream data sets and storing the uniform stream data sets into a uniform transmitter buffer, (b) sequentially processing the bursty data stream to produce bursty data sets and storing the bursty data sets into a bursty transmitter buffer, (c) transmitting the next available uniform data set from the uniform transmitter buffer onto the medium, (d) if the number of uniform data sets transmitted onto the medium is less than a predetermined threshold, then returning to step (c); otherwise, proceeding to step (e), (e) if the bursty transmitter buffer has stored bursty data sets, proceeding to step (f); otherwise, returning to step (c), (f) transmitting the next available bursty data set from the bursty transmitter buffer onto the medium, (g) if the number of bursty data sets transmitted onto the medium is less than a prescribed threshold, proceeding to step (h); otherwise, returning to step (c), (h) if the bursty transmitter buffer is empty, returning to step (c); otherwise, returning to step (f), and wherein in the receiver, the method comprises the steps of (i) separating uniform data sets and bursty data sets received over the medium into uniform received data sets and bursty received data sets and storing the uniform received data sets and the bursty received data sets into a uniform receiver buffer and a bursty receiver buffer, respectively, and (j) delivering the data sets from the uniform receiver buffer to a customer at a uniform rate.

13. A transmitter for interleaving a uniform data stream and a bursty data stream into an interleaved data stream for transmission over a communications medium, the transmitter comprising a uniform transmitter buffer and a bursty transmitter buffer, a processor for sequentially processing the uniform data stream to produce uniform stream data sets and for storing the uniform stream data sets into the uniform transmitter buffer, and for sequentially processing the bursty data stream to produce bursty data sets and for storing the bursty data sets into the bursty transmitter buffer, a switch circuit, coupled to the uniform transmitter buffer and the bursty transmitter buffer, for connecting the uniform transmitter buffer and the medium to transmit the next available uniform data set from the uniform transmitter buffer onto the medium, the switch circuit being connected to the uniform transmitter buffer and the medium as long as the number of uniform data sets transmitted onto the medium is less than a predetermined threshold, the switch circuit also being arranged for connecting the bursty transmitter buffer and the medium to transmit the next available bursty data set from the bursty transmitter buffer onto the medium whenever the bursty transmitter buffer has stored bursty data sets and the number of bursty data sets transmitted onto the medium is less than a prescribed threshold.

* * * * *